United States Patent
Zhang et al.

(10) Patent No.: US 10,043,308 B2
(45) Date of Patent: Aug. 7, 2018

(54) IMAGE PROCESSING METHOD AND APPARATUS FOR THREE-DIMENSIONAL RECONSTRUCTION

(71) Applicant: Huawei Technologies Co., Ltd., Shenzhen (CN)

(72) Inventors: Wei Zhang, Shenzhen (CN); Chunjing Xu, Shenzhen (CN); Jianzhuang Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 15/296,138

(22) Filed: Oct. 18, 2016

(65) Prior Publication Data

US 2017/0039761 A1    Feb. 9, 2017

Related U.S. Application Data

(63) Continuation of application No. PCT/CN2015/078535, filed on May 8, 2015.

(30) Foreign Application Priority Data

May 14, 2014    (CN) .......................... 2014 1 0204145

(51) Int. Cl.
*G06F 7/533*    (2006.01)
*G06T 17/10*    (2006.01)
(Continued)

(52) U.S. Cl.
CPC ............... *G06T 17/10* (2013.01); *G06T 7/12* (2017.01); *G06T 7/13* (2017.01); *G06T 7/149* (2017.01);
(Continued)

(58) Field of Classification Search
None
See application file for complete search history.

(56) References Cited

U.S. PATENT DOCUMENTS

| 7,006,683 B2 * | 2/2006 | Brand ..................... G06T 7/579 |
| | | 345/419 |
| 7,415,152 B2 | 8/2008 | Jiang et al. |
| | (Continued) | |

FOREIGN PATENT DOCUMENTS

| CN | 1776712 A | 5/2006 |
| CN | 1866271 A | 11/2006 |
| | (Continued) | |

OTHER PUBLICATIONS

Machine Translation and Abstract of Chinese Publication No. CN1866271, Nov. 22, 2006, 12 pages.
(Continued)

*Primary Examiner* — Jason Pringle-Parker
(74) *Attorney, Agent, or Firm* — Conley Rose, P.C.

(57) ABSTRACT

An image processing method and apparatus are disclosed. The method includes obtaining a two-dimensional target face image, receiving an identification curve marked by a user in the target face image, locating a facial contour curve of a face from the target face image according to the identification curve and by using an image segmentation technology, determining a three-dimensional posture and a feature point position of the face in the target face image, and constructing a three-dimensional shape of the face in the target face image according to the facial contour curve, the three-dimensional posture, and the feature point position of the face in the target face image by using a preset empirical model of a three-dimensional face shape and a target function matching the empirical model of the three-dimensional face shape.

20 Claims, 7 Drawing Sheets

(51) Int. Cl.
*G06T 7/12* (2017.01)
*G06T 7/149* (2017.01)
*G06T 17/00* (2006.01)
*G06T 7/13* (2017.01)

(52) U.S. Cl.
CPC .... *G06T 17/00* (2013.01); *G06T 2207/10004* (2013.01); *G06T 2207/20096* (2013.01); *G06T 2207/20124* (2013.01); *G06T 2207/30201* (2013.01)

(56) References Cited

U.S. PATENT DOCUMENTS

| | | | |
|---|---|---|---|
| 7,436,988 B2* | 10/2008 | Zhang | G06K 9/00268 382/118 |
| 8,155,399 B2 | 4/2012 | Liu et al. | |
| 8,200,017 B2 | 6/2012 | Liang et al. | |
| 9,378,576 B2* | 6/2016 | Bouaziz | G06T 13/40 |
| 2005/0063582 A1* | 3/2005 | Park | G06T 17/10 382/154 |
| 2009/0185746 A1* | 7/2009 | Mian | G06K 9/00201 382/209 |
| 2010/0134487 A1 | 6/2010 | Lai et al. | |
| 2011/0075916 A1* | 3/2011 | Knothe | G06K 9/00201 382/154 |
| 2012/0322938 A1 | 12/2012 | Tan | |
| 2013/0301906 A1 | 11/2013 | Yoon et al. | |
| 2013/0307848 A1 | 11/2013 | Tena et al. | |

FOREIGN PATENT DOCUMENTS

| | | |
|---|---|---|
| CN | 102054291 A | 5/2011 |
| CN | 102376100 A | 3/2012 |
| CN | 102831382 A | 12/2012 |
| CN | 102880866 A | 1/2013 |
| CN | 102999942 A | 3/2013 |
| CN | 103413351 A | 11/2013 |
| WO | 2011079458 A1 | 7/2011 |

OTHER PUBLICATIONS

Machine Translation and Abstract of Chinese Publication No. CN102880866, Jan. 16, 2013, 10 pages.
Foreign Communication From a Counterpart Application, Chinese Application No. 201410204145.3, Chinese Office Action dated Aug. 11, 2017, 6 pages.
Machine Translation and Abstract of Chinese Publication No. CN102999942, Mar. 27, 2013, 4 pages.
Dimitrijevic, M., et al., "Accurate Face Models from Uncalibrated and Ill-Lit Video Sequences," Proceedings of the IEEE Computer Society Conference on Computer Vision and Pattern Recognition, Jul. 19, 2004, 8 pages.
Blanz, V. et al. "A Morphable Model for the Synthesis of 3D Faces," Proceedings of the 26th annual conference on Computer graphics and Interactive techniques, 1999, 8 pages.
Xin, L., et al., "Automatic 3D Face Modeling from Video," Proceedings of the Tenth IEEE International Conference on Computer Vision, 2005, 7 pages.
Hu, Y., et al., "Automatic 3D Reconstruction for Face Recognition," Proceedings of the IEEE International Conference on Automatic Face and Gesture Recognition, 2004, 6 pages.
Ozuysal, M., et al., "Fast Keypoint Recognition in Ten Lines of Code," IEEE Computer Society Conference on Computer Vision and Pattern Recognition, Jun. 18-23, 2007, 8 pages.
Everingham, M., et al., "Hello! My name is . . . Buffy—Automatic Naming of Characters in TV Video," 2006, 10 pages.
Shan, Y., et al., "Model-Based Bundle Adjustment with Application to Face Modeling," International Conference on Computer Vision, Aug. 7, 2002, 8 pages.
Zhuang, H., et al., "A Method for Creating 3D Face from a 2D Face Image," Florida Conference on Recent Advances in Robotics, May 25-26, 2006, 8 pages.
Foreign Communication From a Counterpart Application, European Application No. 15792406.9, Extended European Search Report dated Feb. 20, 2017, 10 pages.
Foreign Communication From a Counterpart Application, PCT Application No. PCT/CN2015/078535, English Translation of International Search Report dated Aug. 5, 2015, 2 pages.
Foreign Communication From a Counterpart Application, PCT Application No. PCT/CN2015/078535, English Translation of Written Opinion dated Aug. 5, 2015, 6 pages.
Machine Translation and Abstract of Chinese Publication No. CN1776712, dated May 24, 2006, 9 pages.
Hu, Y., et al., "3D Face Reconstruction Based on the Improved Morphable Model," Chinese Journal of Computers, Oct. 2005, 2 pages.
Jia, B., et al, "3D face reconstruction using binocular stereo vision," Caai Transactions on Intelligent Systems, Jun. 2009, 2 pages.
Foreign Communication From a Counterpart Application, Chinese Application No. 201410204145.3, Chinese Office Action dated Jun. 8, 2018, 5 pages.

* cited by examiner

IMAGE PROCESSING METHOD AND APPARATUS FOR THREE-DIMENSIONAL RECONSTRUCTION

CROSS-REFERENCE TO RELATED APPLICATIONS

This application is a continuation of International Application No. PCT/CN2015/078535, filed on May 8, 2015, which claims priority to Chinese Patent Application No. 201410204145.3, filed on May 14, 2014. The disclosures of the aforementioned applications are hereby incorporated by reference in their entireties.

TECHNICAL FIELD

This application relates to the field of image processing technologies, and more specifically, to an image processing method and apparatus.

BACKGROUND

Image-based three-dimensional face reconstruction refers to constructing a three-dimensional face model according to a two-dimensional image or video including a face. Three-dimensional face reconstruction is a research focus in the computer vision research field, and is widely applied to the fields such as biological information authentication and identification, computer games, and a telephone conference system.

In a three-dimensional face reconstruction process, a three-dimensional shape and a texture of a face need to be restored from a two-dimensional image of the face, and then structurization is performed on the three-dimensional shape and the texture of the face, so as to construct a three-dimensional face. To precisely construct the three-dimensional face, in a process of constructing a three-dimensional face shape, a face image needs to be shot by using a binocular camera, so as to obtain the two-dimensional image and depth information of the face, two-dimensional structure information in the two-dimensional image is extracted, and three-dimensional shape construction is performed by using the two-dimensional structure information and the depth information. However, in a manner of constructing the three-dimensional face shape by using the two-dimensional structure information and the depth information of the two-dimensional image, at the same time when the two-dimensional image is shot, the depth information corresponding to the two-dimensional image is obtained, which imposes a relatively high requirement on a face image shooting apparatus. Therefore, complexity of three-dimensional face shape construction is increased, and complexity of three-dimensional face reconstruction is also increased, which hinders wide promotion of three-dimensional face reconstruction.

SUMMARY

In view of this, this application provides an image processing method and apparatus, so as to reduce complexity of three-dimensional face reconstruction.

To achieve the foregoing objective, a first aspect of this application provides an image processing method, including obtaining a two-dimensional target face image, receiving an identification curve marked by a user in the target face image, where the identification curve is used to indicate face contour distribution in the target face image, locating a facial contour curve of a face from the target face image according to the identification curve and by using an image segmentation technology, determining a three-dimensional posture of the face in the target face image, detecting a feature point position of the face in the target face image, and constructing a three-dimensional shape of the face in the target face image according to the facial contour curve, the three-dimensional posture, and the feature point position of the face in the target face image by using a preset empirical model of a three-dimensional face shape and a target function matching the empirical model of the three-dimensional face shape, where the target function is used to determine a deformation coefficient of the empirical model according to the three-dimensional posture, the facial contour curve, and the feature point position of the face in the target face image, and mappings of the facial contour curve and the feature point position of the face onto three-dimensional space.

With reference to the first aspect, in a first possible implementation manner, the receiving an identification curve marked by a user in the target face image includes: receiving an initial facial contour curve that is of the face and marked by the user in the target face image, and the locating a facial contour curve of a face from the target face image according to the identification curve and by using an image segmentation technology includes: extracting a sub-image area including the initial facial contour curve from the target face image, partitioning the sub-image area by using an image over-segmentation technology, to obtain at least two segmentation areas, extracting boundaries of the at least two segmentation areas, and matching, by using a curve matching algorithm from the boundaries of the at least two segmentation areas, a boundary curve closest to the initial facial contour curve, and determining the matched boundary curve as the facial contour curve of the face in the target face image.

With reference to the first aspect, in a second possible implementation manner, the receiving an identification curve marked by a user in the target face image includes: receiving a first identification curve and a second identification curve that are entered by the user into the target face image, where the first identification curve is used to identify a foreground area that is in the target face image and that includes the face, and the second identification curve is used to identify a background area that is in the target face image and that does not include the face, and the locating a facial contour curve of a face from the target face image according to the identification curve and by using an image segmentation technology includes: partitioning the foreground area and the background area of the target face image by using the image segmentation technology with reference to the first identification curve and the second identification curve, and performing contour line extraction on the target face image according to the foreground area and the background area of the target face image, to extract the facial contour curve of the face in the target face image.

With reference to the first aspect, in a third possible implementation manner, the determining a three-dimensional posture of the face in the target face image includes detecting a face area in the target face image, performing binarization feature extraction in the face area, and performing regression prediction according to an extracted binarization feature and by using a preset posture regression prediction function, to obtain the three-dimensional posture of the face in the target face image.

With reference to the first aspect, in a fourth possible implementation manner, the detecting a feature point position of the face in the target face image includes: determining a face area in the target face image, performing, according to a preset face initial feature point position, binarization feature extraction in a specified range of the initial feature point position in the face area, and performing regression prediction according to an extracted binarization feature by using a preset feature point regression prediction function, to obtain the feature point position of the face in the target face image.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, the constructing a three-dimensional shape of the face in the target face image according to the facial contour curve, the three-dimensional posture, and the feature point position of the face in the target face image by using a preset empirical model of a three-dimensional face shape and a target function matching the empirical model of the three-dimensional face shape includes: determining an optimal value of the deformation coefficient in the empirical model of the three-dimensional face shape according to the mappings of the face facial contour curve and the face feature point position onto the three-dimensional space by using the target function matching the preset empirical model of the three-dimensional face shape, where the target function is:

$$\{\theta^*, b^*\} = \operatorname{argmin}_{\{\theta, b\}} \|(X^c, X^e) - (I^c, I^e) P_\theta (\mu + \Phi b)\|_2 + \lambda \|b/\rho\|_2,$$

where $\theta$ is the three-dimensional posture of the face in the target face image, $\theta^*$ is an optimal value of the three-dimensional posture of the face, b is the deformation coefficient in the empirical model of the three-dimensional face shape, $b^*$ is an optimal value of the deformation coefficient b that is in the empirical model of the three-dimensional face shape and determined according to the target function, $X^c$ is an parameterization representation of the facial contour curve of the face in the target face image, $X^e$ is an parameterization representation of the feature point position of the face in the target face image, $I^c$ is an parameterization representation obtained after the facial contour curve $X^c$ is mapped onto the three-dimensional space, $I^e$ is an parameterization representation obtained after the feature point position of the face is mapped onto the three-dimensional space, $\mu$ is a preset average description of the three-dimensional face shape, $\Phi$ is a linear description of face shape deformation, $P_\theta$ is a projection function determined by using the three-dimensional posture $\theta$ of the face, and $\rho$ is a preset deformation empirical parameter, where $$I^c = \operatorname{argmin}_{\{S'\}} \|P_\theta(S') - X^c\|_2, \text{ and}$$

S' is a preset initial three-dimensional face shape, and inputting the optimal value of the deformation coefficient to the empirical model of the three-dimensional face shape, to construct the three-dimensional shape of the face in the target face image, where the empirical model of the three-dimensional face shape is:

$$S = \mu + \Phi b,$$

where S is a parameterization representation of the three-dimensional face shape.

According to another aspect, a second aspect of this application provides an image processing apparatus, including: an image obtaining apparatus, configured to obtain a two-dimensional target face image, an input unit, configured to receive an identification curve marked by a user in the target face image, where the identification curve is used to indicate face contour distribution in the target face image, a contour location unit, configured to locate a facial contour curve of a face from the target face image according to the identification curve and by using an image segmentation technology, a posture determining unit, configured to determine a three-dimensional posture of the face in the target face image, a feature point location unit, configured to detect a feature point position of the face in the target face image, and a shape construction unit, configured to construct a three-dimensional shape of the face in the target face image according to the facial contour curve, the three-dimensional posture, and the feature point position of the face in the target face image by using a preset empirical model of a three-dimensional face shape and a target function matching the empirical model of the three-dimensional face shape, where the target function is used to determine a deformation coefficient of the empirical model according to the three-dimensional posture, the facial contour curve, and the feature point position of the face in the target face image, and mappings of the facial contour curve and the feature point position of the face onto three-dimensional space.

With reference to the second aspect, in a first possible implementation manner, the input unit includes: a first input subunit, configured to receive an initial facial contour curve that is of the face and marked by the user in the target face image, and the contour location unit includes: an extraction subunit, configured to extract a sub-image area including the initial facial contour curve from the target face image, an area segmentation subunit, configured to partition the sub-image area by using an image over-segmentation technology, to obtain at least two segmentation areas, a boundary extraction subunit, configured to extract boundaries of the at least two segmentation areas, and a first contour location subunit, configured to match, by using a curve matching algorithm from the boundaries of the at least two segmentation areas, a boundary curve closest to the initial facial contour curve, and determine the matched boundary curve as the facial contour curve of the face in the target face image.

With reference to the second aspect, in a second possible implementation manner, the input unit includes: a second input subunit, configured to receive a first identification curve and a second identification curve that are entered by the user into the target face image, where the first identification curve is used to identify a foreground area that is in the target face image and that includes the face, and the second identification curve is used to identify a background area that is in the target face image and that does not include the face, and the contour location unit includes: a foreground segmentation subunit, configured to partition the foreground area and the background area of the target face image by using the image segmentation technology with reference to the first identification curve and the second identification curve, and a second contour location subunit, configured to perform contour line extraction on the target face image according to the foreground area and the background area of the target face image, to extract the facial contour curve of the face in the target face image.

With reference to the second aspect, in a third possible implementation manner, the posture determining unit includes: a face detection unit, configured to detect a face area in the target face image, a first feature extraction unit, configured to perform binarization feature extraction in the face area, and a posture prediction unit, configured to perform regression prediction according to an extracted binarization feature and by using a preset posture regression prediction function, to obtain the three-dimensional posture of the face in the target face image.

With reference to the second aspect, in a fourth possible implementation manner, the feature point location unit includes: a face area determining unit, configured to determine a face area in the target face image, a second feature extraction unit, configured to perform, according to a preset face initial feature point position, binarization feature extraction in a specified range of the initial feature point position in the face area, and a feature point prediction unit, configured to perform regression prediction according to an extracted binarization feature by using a preset feature point regression prediction function, to obtain the feature point position of the face in the target face image.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner, the shape construction unit includes: a deformation coefficient determining unit, configured to determine an optimal value of the deformation coefficient in the empirical model of the three-dimensional face shape according to the mappings of the face facial contour curve and the face feature point position onto the three-dimensional space by using the target function matching the preset empirical model of the three-dimensional face shape, where the target function is:

$$\{\theta^*, b^*\} = \mathrm{argmin}_{\{\theta, b\}} \|(X^c, X^e) - (I^c, I^e) P_\theta(\mu + \Phi b)\|_2 + \lambda \|b/\rho\|_2,$$

where θ is the three-dimensional posture of the face in the target face image, θ* is an optimal value of the three-dimensional posture of the face, b is the deformation coefficient in the empirical model of the three-dimensional face shape, b* is an optimal value of the deformation coefficient b that is in the empirical model of the three-dimensional face shape and determined according to the target function, $X^c$ is an parameterization representation of the facial contour curve of the face in the target face image, $X^e$ is an parameterization representation of the feature point position of the face in the target face image, $I^c$ is an parameterization representation obtained after the facial contour curve $X^c$ is mapped onto the three-dimensional space, $I^e$ is an parameterization representation obtained after the feature point position of the face is mapped onto the three-dimensional space, μ is a preset average description of the three-dimensional face shape, Φ is a linear description of face shape deformation, $P_\theta$ is a projection function determined by using the three-dimensional posture θ of the face, and ρ is a preset deformation empirical parameter, where $$I^c = \mathrm{argmin}_{\{S'\}} \|P_\theta(S') - X^c\|_2, \text{ and}$$

S' is a preset initial three-dimensional face shape, and a shape construction subunit, configured to input the optimal value of the deformation coefficient to the empirical model of the three-dimensional face shape, to construct the three-dimensional shape of the face in the target face image, where the empirical model of the three-dimensional face shape is: $S = \mu + \Phi b$,
where S is a parameterization representation of the three-dimensional face shape.

It may be learned from the foregoing technical solution that after a two-dimensional target face image is obtained, a deformation coefficient in an empirical model of a three-dimensional face shape is determined according to a three-dimensional posture, a feature point position, and a facial contour curve of a face determined in the target face image, and mappings of the facial contour curve and the feature point position of the face onto three-dimensional space by using a target function matching the empirical model of the three-dimensional face shape, and a three-dimensional shape of the face is determined by using the empirical model. Therefore, the three-dimensional shape of the face can be constructed according to the target face image without requiring the target face image to include depth information, thereby reducing complexity of three-dimensional face reconstruction.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

This application provides an image processing method and apparatus, so as to reduce complexity of three-dimensional face reconstruction.

The following clearly describes the technical solutions in the embodiments of this application with reference to the accompanying drawings in the embodiments of this application. The described embodiments are merely some but not all of the embodiments of this application. All other embodiments obtained by a person of ordinary skill in the art according to the embodiments of this application without creative efforts shall fall within the protection scope of this application.

Figure 1:
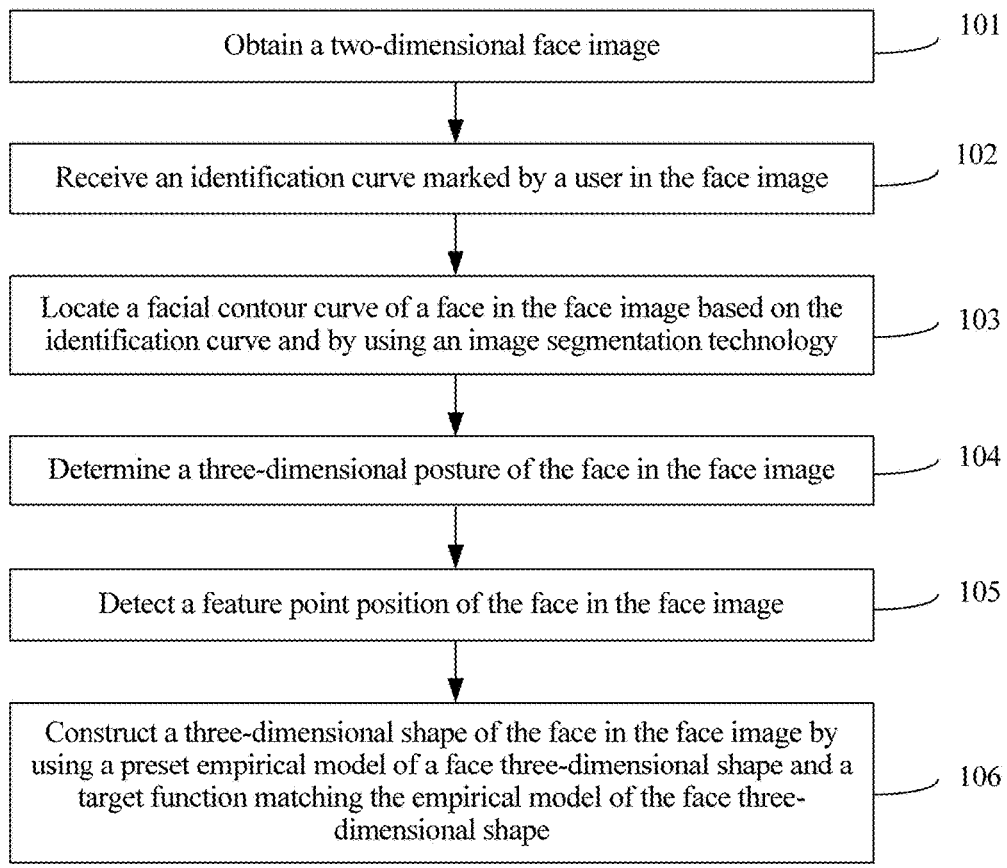
FIG. 1 shows a schematic flowchart of an embodiment of an image processing method according to this application.

First, a three-dimensional face shape construction method is described. Referring to FIG. 1, a schematic flowchart of an embodiment of an image processing method according to this application is shown. The method in this embodiment may include the following.

101. Obtain a two-dimensional target face image.

A two-dimensional face image is obtained, so as to construct a three-dimensional face shape according to the face image.

For ease of distinguishing, the obtained to-be-processed face image is referred to as a target face image.

102. Receive an identification curve marked by a user in the target face image.

The identification curve is used to indicate face contour distribution in the target face image. For example, the face contour distribution may be a shape of a face contour, a position of a face contour, or a trend of a face contour curve.

The user may outline the identification curve in a displayed target face image by using a mouse or in a manner of sliding on a touchscreen or the like.

103. Locate a facial contour curve of a face from the target face image according to the identification curve and by using an image segmentation technology.

Because the identification curve can implement a function of indicating a position of a face curve area, partitioning the target face image helps quickly and accurately determine, in segmentation areas, an area including the face, thereby precisely obtaining the facial contour curve of the face.

104. Determine a three-dimensional posture of the face in the target face image.

The three-dimensional posture of the face refers to orientation information of the face in three-dimensional space, rotation angles of the face on X, Y, Z coordinate axes perpendicular to each other in the three-dimensional space.

The three-dimensional posture of the face in the target face image may be determined in any existing manner of detecting the three-dimensional posture of the face in the target face image, which is not limited herein.

105. Detect a feature point position of the face in the target face image.

In this embodiment, the feature point position of the face may be detected in any existing manner of face feature point location.

106. Construct a three-dimensional shape of the face in the target face image by using a preset empirical model of a three-dimensional face shape and a target function matching the empirical model of the three-dimensional face shape.

The empirical model of the three-dimensional face shape is a statistical model that is obtained by means of training in advance and used to describe a difference between different face shapes and a face shape change caused by an expression. Because the empirical model of the three-dimensional face shape is a model constructed according to priori knowledge of a face shape, the empirical model of the three-dimensional face shape is also referred to in the art as a prior model of a three-dimensional face shape.

The empirical model in this embodiment of this application may be any empirical model of a three-dimensional face shape, which is not limited.

The target function is used to determine, according to the three-dimensional posture, the facial contour curve, and the feature point position of the face in the target face image, and mappings of the facial contour curve and the feature point position of the face onto the three-dimensional space, a deformation coefficient, corresponding to the three-dimensional face shape, in the empirical model.

To determine the three-dimensional shape of the face in the target face image according to the empirical model of the face shape, a deformation coefficient, corresponding to the face in the target face image, in the empirical model needs to be determined first. Therefore, the data such as the facial contour curve, the three-dimensional posture, and the feature point position of the face needs to be input to the target function matching the empirical model, so as to solve for the deformation coefficient of the empirical model by using the target function, and determine the three-dimensional shape of the face according to the empirical model.

When the deformation coefficient of the empirical model is determined according to the target function, in addition to the three-dimensional posture and the feature point position, the facial contour curve of the face and a face deformation factor, a mapping of the facial contour curve of the face onto the three-dimensional space further need to be relied on. Therefore, the determined deformation coefficient can more precisely reflect deformation of the face in the target face image, and further precision of the constructed three-dimensional shape of the face is relatively high.

It may be understood that in this embodiment, a sequence of step 102, step 104, and step 106 is not limited to that shown in FIG. 1. Actually, a sequence of step 102, step 104, and step 106 may be changed, or step 102, step 104, and step 106 may be performed at the same time.

In this embodiment, a deformation coefficient in an empirical model of a three-dimensional face shape is determined by using a target function matching the empirical model of the three-dimensional face shape according to a three-dimensional posture, a feature point position, and a facial contour curve of a face that are determined from a target face image, and mappings of the facial contour curve and the feature point position of the face onto three-dimensional space, and a three-dimensional shape of the face is determined by using the empirical model. Therefore, the three-dimensional shape of the face can be constructed according to the target face image without requiring the target face image to include depth information, thereby reducing complexity of three-dimensional face reconstruction. When the deformation coefficient is determined, the facial contour curve of the face and the face deformation factor, the mapping of the facial contour curve of the face onto the three-dimensional space are considered. Therefore, the deformation coefficient can more accurately reflect deformation of the face in the target face image, and precision of the constructed three-dimensional shape if the face is high, which makes it possible to precisely construct a three-dimensional face, and implements reduction in complexity of three-dimensional face reconstruction on a basis of ensuring precision of three-dimensional face construction.

It should be noted that complexity of constructing the three-dimensional shape of the face according to the method in this application is low, so that the method in this application can not only be applied to a computer with a relatively strong computing capability, but also be applied to a mobile terminal, such as a mobile phone, with a relatively poor computing capability, or another interactive device.

It may be understood that in this application, after the user marks, in the target face image in a manner of user interaction, the identification curve used to indicate a face position, in a process of partitioning the target face image by using the image segmentation technology, facial contour line extraction may be performed according to the identification curve, which helps reduce a calculation amount of facial contour line extraction.

According to different actual requirements, there may be multiple different cases of the identification curve entered by the user, and accordingly, processes of extracting a facial contour line of the face in the target face image also vary according to the identification curve.

Corresponding to a manner of extracting the facial contour curve of the face in this application, the identification curve may be an initial facial contour curve of the face. The initial facial contour curve may be a curve roughly marked by the user along a contour of the face in the target face image, so as to indicate a position and an approximate trend of the facial contour line of the face.

Correspondingly, after receiving the initial facial contour curve of the face marked by the user in the target face image, a system records a position of the initial facial contour curve, and extracts a sub-image area including the initial facial contour curve from the target face image. Then, the sub-image area is partitioned by using an image over-segmentation technology to obtain at least two segmentation areas, boundaries of the at least two segmentation areas obtained by means of segmentation are extracted, a boundary curve closest to the initial facial contour curve is matched from the boundaries of the at least two segmentation areas by using a curve matching algorithm, and the matched boundary curve is determined as the facial contour curve of the face in the target face image.

A size of the sub-image area including the initial facial curve may be preset, for example, it may be set that in the target face image, an area including points whose distance to a point on the initial facial curve is less than a preset distance is the sub-image area.

Actually, after image over-segmentation is performed on the sub-image area, multiple small areas are generally obtained, where color features of points in each area are consistent. Then, boundaries of the small areas are extracted, and the initial facial contour curve of the face may be matched to a closest small area boundary by using a curve matching algorithm such as an active contour model, the facial contour curve is obtained.

Figure 2A:
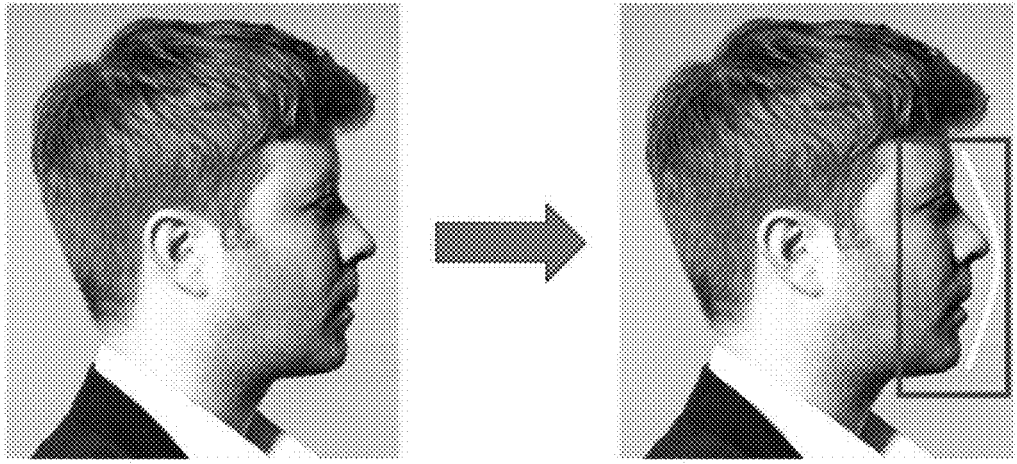
FIG. 2A and FIG. 2B show schematic diagrams of extracting a facial contour curve according to an identification curve entered by a user according to this application.
Figure 2B:
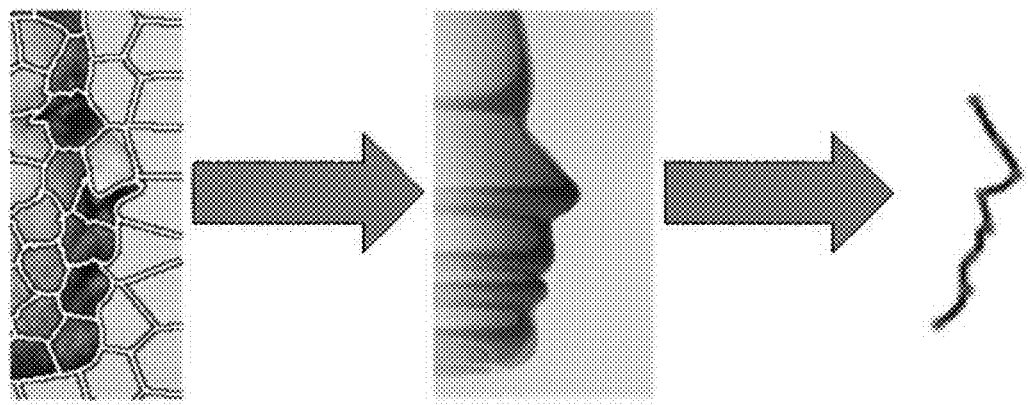

To help understand the foregoing process of extracting a facial contour curve, refer to FIG. 2A and FIG. 2B. FIG. 2A is a schematic diagram of a process of extracting a sub-image area according to an identification curve marked by a user in a target face image. FIG. 2B is a schematic diagram of a process of extracting a facial contour curve from a sub-image area according to an identification curve entered by a user.

The left image in FIG. 2A is an initial target face image without being processed, and the white bold solid line on the right of the target face image in FIG. 2A is an initial facial contour curve of the face marked by the user. The image area in the rectangular block on the right of the target face image in FIG. 2A is the sub-image area including the initial facial contour curve.

FIG. 2B includes three images sequentially changing from left to right, where the leftmost image shows extracted boundaries of areas after the sub-image area is partitioned by using the image over-segmentation technology, as shown by alveolate line boundaries in the figure. The middle image is a schematic diagram of matching the initial facial contour curve with the closest area boundary by using the curve matching algorithm. The matched area boundary is output, and the facial contour curve of the face is obtained, as shown by the curve in the rightmost image in FIG. 2B.

Figure 3:
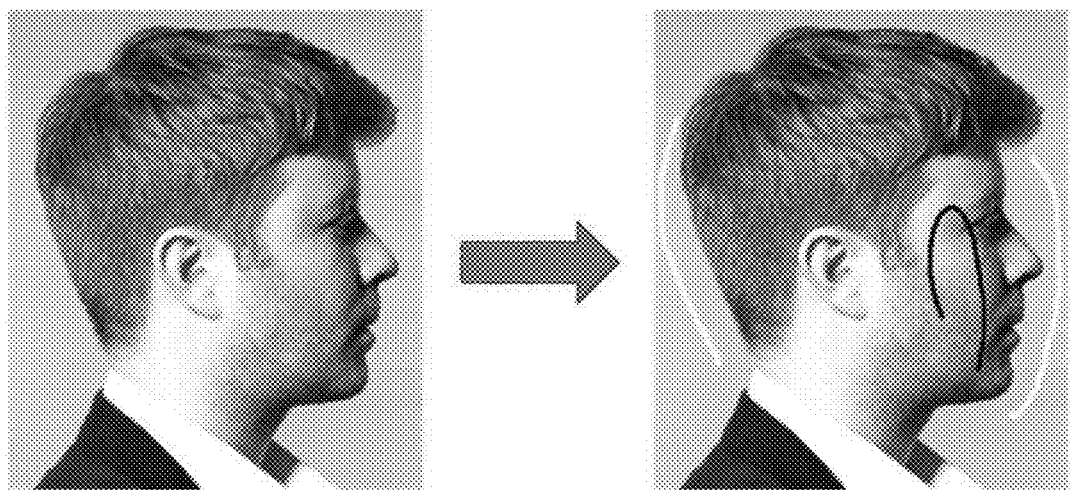
FIG. 3 shows a schematic diagram of a first identification curve and a second identification curve marked by a user in a target face image.

Corresponding to another manner of extracting the facial contour curve of the face in this application, the identification curve may include a first identification curve and a second identification curve. The first identification curve is used to identify a foreground area that is in the target face image and that includes the face, and the second identification curve is used to identify a background area that is in the target face image and that does not include the face. As shown in FIG. 3, a schematic diagram of the first identification curve and the second identification curve marked by the user in the target face image is shown. It may be learned that the black curve marked in the face in the target face image is the first identification curve, and the white bold solid line marked in a background outside of a face area is the second identification curve.

The foreground area and the background area of the target face image may be partitioned according to obtained positions of the first identification curve and the second identification curve by using the image segmentation technology. Contour line extraction is performed on the target face image according to the foreground area and the background area of the target face image, and the facial contour curve of the face in the target face image is extracted.

The foregoing two described manners of entering the identification curve are merely two types of exemplary descriptions. A manner of extracting the facial contour curve of the face according to another identification curve that is entered by the user and used to identify the face contour distribution is also applicable to this application.

It may be understood that because in this embodiment of this application the user enters, in a manner of user interaction, the identification curve that identifies the face contour distribution, so as to quickly and accurately locate the facial contour curve of the face, the method in this embodiment of this application is applicable to an interaction device. In addition, because in this embodiment of this application complexity of a process of constructing the three-dimensional shape of the face is relatively low, this application is particularly applicable to a mobile or portable interaction device. For example, the interaction device may be a mobile phone, a personal digital assistant (PDA), or a tablet computer.

Figure 4:
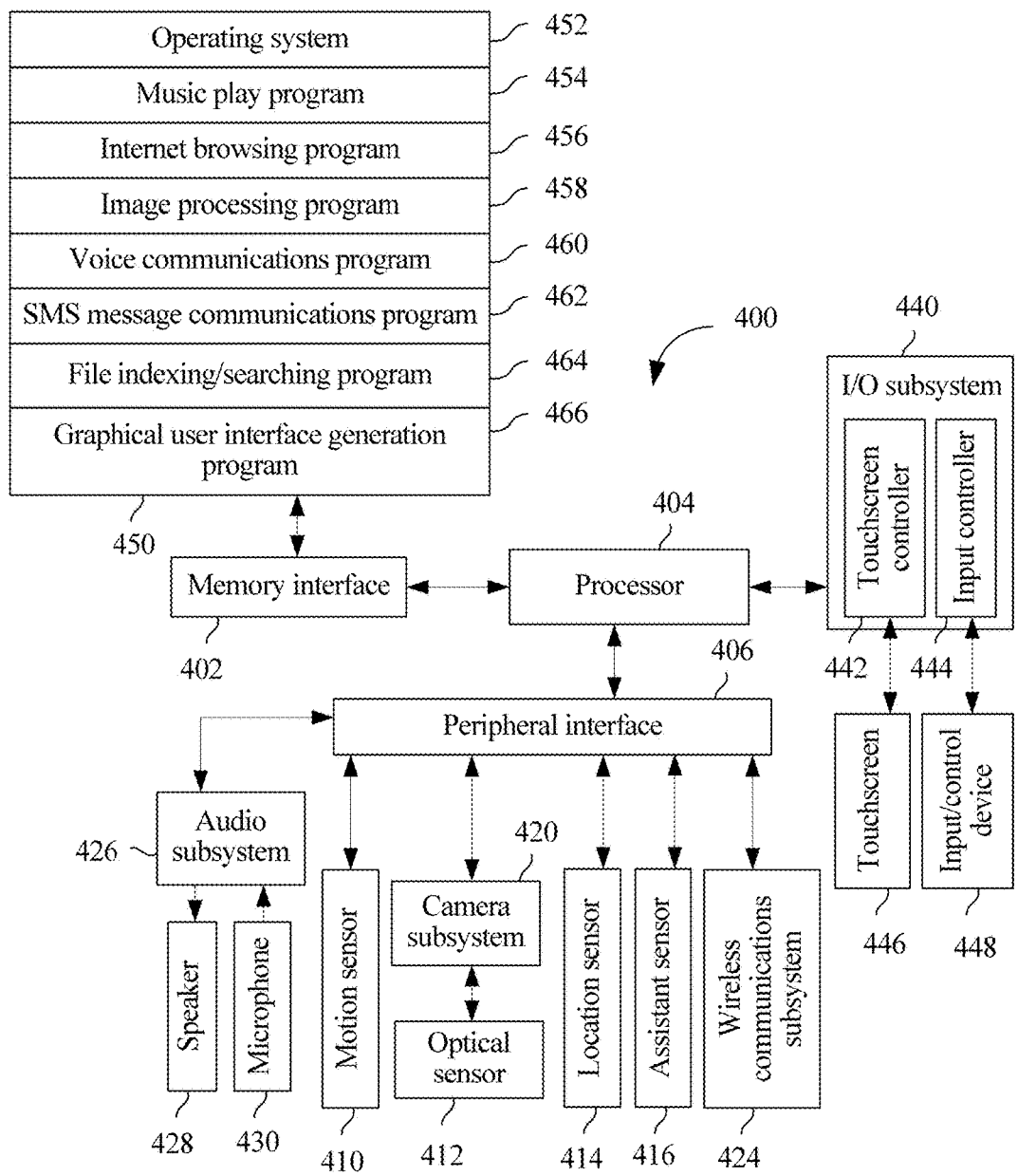
FIG. 4 shows a schematic diagram of a system structure of an interaction device for image processing according to an embodiment of this application.

For example, referring to FIG. 4, a schematic diagram of a system structure 400 of an interaction device according to an embodiment of this application is shown. It should be understood that the interaction device may have more or less parts than those shown in the figure, and may combine two or more parts or have different part configurations. Various parts shown in the figure may be implemented in hardware including one or more signal processing and/or application-specific integrated circuits, in software, or in a combination of hardware and software.

Now, detailed description is made on the interaction device that is configured for image processing and provided in FIG. 4.

A system architecture of the interaction device may include a memory interface 402, one or more data processors, image processors, and/or central processing units 404, and a peripheral interface 406.

The memory interface 402, the one or more processors 404, and/or the peripheral interface 406 may be separate components or be integrated into one or more integrated circuits. Components in the system architecture 400 may be connected by using one or more communication buses or signal lines. A sensor, a device, and a subsystem may be connected to the peripheral interface 406 to assist in implementing various functions of the interaction device. For example, a motion sensor 410, an optical sensor 412, and a position sensor 414 may be connected to the peripheral interface 406 to assist in implementing functions of the interaction device, such as a motion sensing function, an environment brightness sensing function, and a position sensing function, or may cooperate with each other to implement a specific function. Another assistant sensor 416 may also be connected to the peripheral interface 406, for example, a positioning system (for example, a GPS receiver), a temperature sensor, a biometric feature measurement sensor, an atmosphere sensor, and an altitude sensor to assist in implementing various related functions of the interaction device.

The system architecture 400 of the interaction device further includes a camera subsystem 420, where the camera subsystem 420 uses the optical sensor 412, for example, a charge coupling apparatus CCD or a complementary metal-oxide-semiconductor CMOS optical sensor, to assist the camera subsystem in implementing a corresponding image obtaining function. For example, the optical sensor assists the camera subsystem in obtaining a face image.

The system architecture 400 of the interaction device further includes a wireless communications subsystem 424, where the wireless communications subsystem 424 is configured to make the interaction device have a wireless communications function, and the wireless communications subsystem 424 may include a radio frequency receiver and transmitter and/or an optical (for example, infrared) receiver and transmitter. In this embodiment of this application, a face image sent by another network device may be received by using the wireless communications subsystem so as to obtain a to-be-processed two-dimensional face image.

The system architecture 400 of the interaction device further includes an I/O subsystem 440, and the I/O subsystem 440 is configured to make the interaction device implement input and output control. The I/O subsystem 440 may include a touchscreen controller 442 and/or another (one or more) input controller 444. The touchscreen controller 442 may be connected to a touchscreen 446. The touchscreen 446 and the touchscreen controller 442 may detect touching, and a movement and a discontinuity of touching by using any one of multiple touch-sensitive technologies. The touch-sensitive technologies include but are not limited to a capacitive, resistant, infrared, and surface sound wave technology, and another proximity sensing array or another element configured to determine one or more touch points by using the touchscreen 446. For example, the touchscreen may display a to-be-processed face image, a user slides on the displayed face image by using a finger or a stylus, and an objective of marking an identification curve in the face image is achieved by moving a contact point. For example, a finger of the user slides along a contour curve of a face in the face image, so that a sliding track of a contact point forms the identification curve that identifies the contour curve of the face.

The input controller 444 may be connected to another input/control device 448, and the another input/control device 448 may be one or more buttons, rocker switches, thumb rotary switches, infrared ports, USB ports, and/or clicking and selecting devices such as a stylus. In addition, the touchscreen 446 may be configured to present a virtual button and/or keyboard to implement input control on the interaction device.

The memory interface 402 of the system architecture 400 of the interaction device may be connected to a memory 450. The memory 450 may be a high-speed random access memory and/or a non-volatile memory, for example, one or more magnetic disk storage devices, one or more optical storage devices, and/or a flash memory. The memory may store an operating system 452, and the operating system 452 may include an instruction used to process a basic system service and used to perform a hardware-dependent task. The memory 450 may further store multiple executable programs, and the executable programs may be a music play program 454, an Internet browsing program 456, an image processing program 458, a voice communications program 460, a short message service (SMS) message communications program 462, a file indexing/searching program 464, a graphical user interface generation program 466, or another application program having various functions. The memory may further store the obtained face image, the identification curve marked by the user in the face image, and the like.

After the interaction device obtains the to-be-processed face image by using the camera subsystem or the wireless communications subsystem, the memory may store the face image, and the image processor or the central processing unit controls the touchscreen to display the face image and receives the identification curve marked by the user in the face image by using the touchscreen. In addition, the image processor or the central processing unit identifies the face image, determines a feature point and a three-dimensional posture of the face that is in the face image, and then constructs a three-dimensional shape of the face with reference to the identification curve and a preset three-dimensional model of a face shape.

The system architecture of the interaction device further includes an audio subsystem 426, where the audio subsystem 426 is configured to implement a sound pickup or audio signal play function of the interaction device, and the audio subsystem 426 includes a speaker 428 and a microphone 430 to assist in implementing the foregoing sound pickup or audio signal play function.

The foregoing describes an exemplary interaction device implementing the image processing method in this application and a system architecture of the interaction device. The following description of other embodiments may also rely on the foregoing exemplary interaction device.

Optionally, in any one of the foregoing embodiments of this application, to reduce a calculation amount of a process of determining a three-dimensional posture of a face and locating a face feature point, in this application, modeling is performed on estimation of the three-dimensional posture of the face and feature point location by using a regression prediction model, to construct a regression prediction model of the three-dimensional posture of the face and a regression prediction model of a parameter of the feature point of the face. Function forms of regression prediction functions corresponding to the two regression prediction models are actually the same. The following separately describes a process of determining the three-dimensional posture of the face and locating the feature point by using the regression prediction model.

Figure 5:
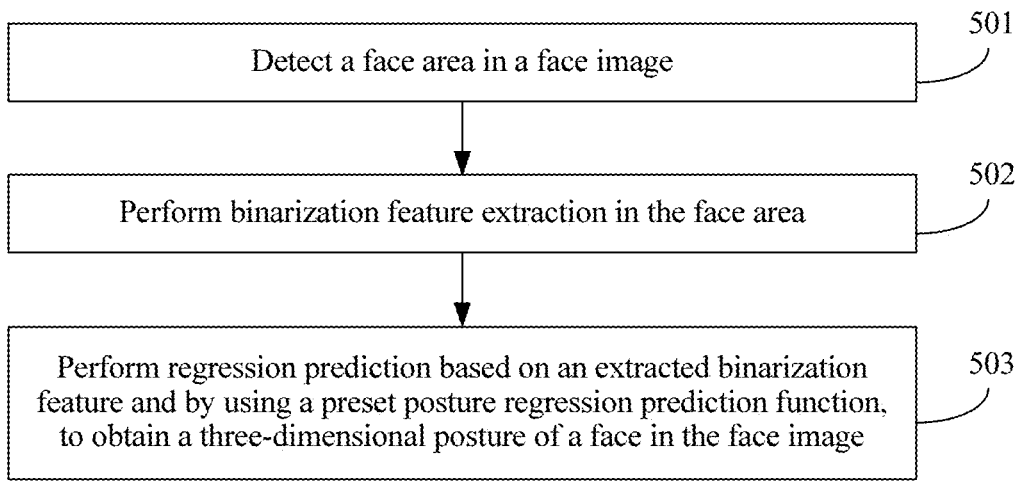
FIG. 5 shows a schematic flowchart of an implementation manner of determining a three-dimensional posture of a face in a target face image in an image processing method according to this application.

Referring to FIG. 5, a schematic flowchart of an implementation manner of determining a three-dimensional posture of a face in a target face image in an image processing method according to this application is shown, and the process may include the following.

501. Detect a face area in the target face image.

The face area including the face may be detected in the target face image in any existing face area detecting manner, which is not limited herein.

502. Perform binarization feature extraction in the face area.

503. Perform regression prediction according to an extracted binarization feature and by using a preset posture regression prediction function, to obtain the three-dimensional posture of the face in the target face image.

When binarization feature extraction is performed in the target face image, binarization feature extraction may be performed at a corresponding position in the face image according to a preset image sampling position. A set including binarization features extracted from the face area in the target face image I may be represented as $F_0(I)=(f_1(I), f_2(I), \ldots f_i(I), \ldots f_m(I))$, where $$f_i(I) = \begin{cases} 1, & I(x_i^1) - I(x_i^2) < I(\tau_j) \\ 0, & \text{else} \end{cases},$$

$f_i(I)$ indicates an $i^{th}$ binarization feature extracted in the target face image I; i=1, 2 ... m, where m is a quantity of extracted binarization features; $I(x_i^1)$ and $I(x_i^2)$ separately describe positions of sampled control points in the target face image I, where the positions of the sampled control points are obtained by training and learning three-dimensional posture data of a pre-marked face image; and $I(\tau_j)$ is a preset reference threshold.

A regression test is performed according to the extracted binarization features by using the following posture regression prediction function:

$$R(F_0(I))=\Sigma_{j=1}^N a_j r_j(F_0(I)) \qquad (1)$$

$a_j$ is a preset learning coefficient of the posture regression prediction function, $r_j$ is a preset adjustable parameter, and N is a preset time of the regression test.

Figure 6:
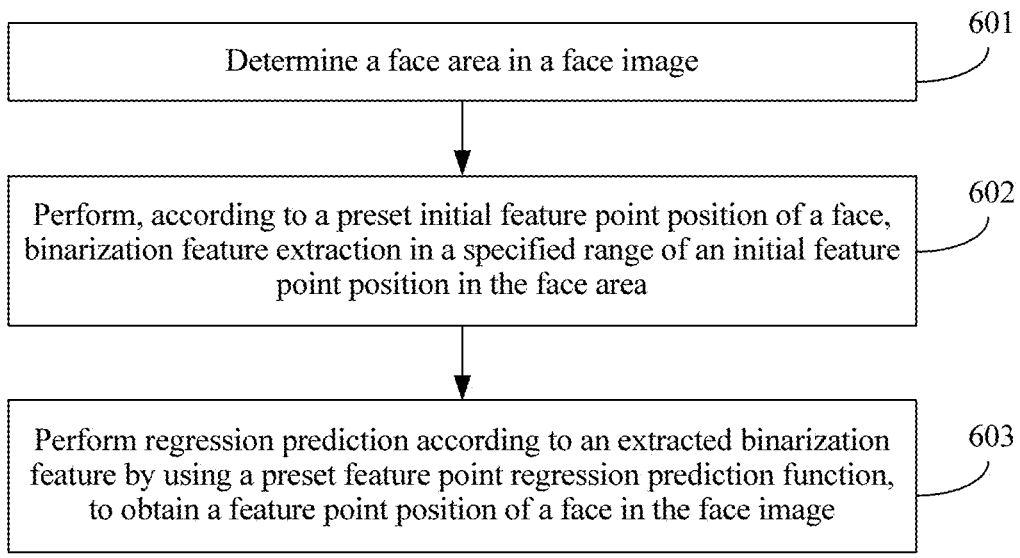
FIG. 6 shows a schematic flowchart of an implementation manner of detecting a feature point position of a face in a target face image in an image processing method according to this application.

Referring to FIG. 6, a schematic flowchart of an implementation manner of detecting a feature point position of a face in a target face image in an image processing method according to this application is shown, and the process may include the following.

601. Determine a face area in the target face image.

The face area may be determined in an existing face area location manner.

Particularly, if the three-dimensional posture of the face has been estimated by using the manner shown in FIG. 5 before a feature point is located, face area data determined in a three-dimensional posture estimation process may be directly used.

602. Perform binarization feature extraction in a specified range of an initial feature point position in the face area according to a preset face initial feature point position.

The face initial feature point position is preset by a system, and for any input target face image, the initial feature point position is the same. For example, the initial feature point position may include preset initial position data of feature points such as a left eye, a right eye, and a mouth in a face.

The initial feature point position is located in the face area in the target face image according to a template of an initial feature point, and binarization feature extraction is performed around the initial face feature point in the face area.

603. Perform regression prediction according to an extracted binarization feature by using a preset feature point regression prediction function to obtain the feature point position of the face in the target face image.

In this embodiment, a function form of the feature point regression prediction function is same as a function form of the posture regression prediction function, except that during feature point position regression prediction, an input parameter is a binarization feature corresponding to a feature point. It may be understood that during feature point position prediction, a position of the binarization feature extracted in the image is different from a position of the binarization feature extracted in the foregoing three-dimensional posture prediction process, and sampling positions in the two prediction processes may be separately set.

Specifically, a set including discrete binarization features extracted around the initial feature point position in the face area in the target face image I may be represented as $F_1(I)=(f_1(I), f_2(I), \ldots f_i(I), \ldots f_n(I))$, where $$f_i(I) = \begin{cases} 1, & I(x_i^1) - I(x_i^2) < I(\tau_j) \\ 0, & \text{else} \end{cases},$$

$f_i(I)$ indicates an $i^{th}$ binarization feature extracted in the target face image I; i=1, 2 ... n, where n is a quantity of extracted binarization features; $I(x_i^1)$ and $I(x_i^2)$ separately describe positions of sampled control points in the target face image I, where the positions of the sampled control points are obtained by training and learning feature point data of a pre-marked face image; and $I(\tau_j)$ is a preset reference threshold.

A regression test is performed according to the extracted binarization feature by using the following feature point regression prediction function:

$$R(F_1(I))=\Sigma_{j=1}^N a_j r_j(F_1(I)) \qquad (2);$$

where $a_j$ is a preset learning coefficient of the feature point regression prediction function, $r_j$ is a preset adjustable parameter, and N is a preset quantity of regression tests.

Preset quantities of regression tests in the posture regression prediction function and the feature point regression prediction function may be different.

It may be understood that to further improve accuracy of locating a feature point, the preset initial face feature point position may include only initial estimation values of center positions of the left eye, the right eye, and the mouth of the face, then binarization feature extraction is performed around the initial estimation values of the three feature points, and extracted binarization features are input to the formula 2, thereby locating the center positions of the left eye, the right eye, and the mouth of the face in the target face image.

After the center positions of the left eye, the right eye, and the mouth of the face are located, binarization features are extracted around the three feature points by using positions of the three feature points as an initial value, and extracted binarization features are substituted into the formula 2, thereby locating more feature point positions in the face, for example, feature point positions such as an eyebrow, a nose, and a corner of mouth of the face.

It may be learned from the foregoing process, in this application, a manner of performing regression prediction by using a regression prediction model is used to determine a three-dimensional posture of a face in a target face image and locate a feature point position, and in an entire calculation process, only image sampling and simple addition and subtraction need to be involved, which greatly reduces a calculation amount when compared with a conventional manner of calculating a three-dimensional posture and a feature point position by using convolution and the like so that the method can be applied to a computing platform with a poor computation capability, such as a mobile terminal.

In any one of the foregoing embodiments, preset empirical models of a three-dimensional face shape may be different, which may be specifically set according to an actual requirement.

Optionally, in any one of the foregoing embodiments, a preset empirical model of the three-dimensional face shape may be:

$$S=\mu+\Phi b; \qquad (3)$$

where S is a parameterization representation of the three-dimensional face shape, a representation form of a to-be-constructed three-dimensional face shape, μ is a preset average description of the three-dimensional face shape, Φ is a linear description of face shape deformation, and b is a to-be-determined deformation coefficient in the empirical model of the three-dimensional face shape.

It may be learned that the three-dimensional face shape is uniquely determined by the deformation coefficient b, and to determine the three-dimensional face shape S, the deformation coefficient b needs to be first determined.

To determine the deformation coefficient b, a target function matching the empirical model of the three-dimensional shape needs to be constructed. To make the deformation coefficient determined according to the target function more accurately reflect a shape change of the face in the target face image, mapping a facial contour and a feature point of the face in the two-dimensional image onto three-dimensional space needs to be considered.

It may be understood that after a feature point position of the face in the two-dimensional target face image is mapped onto the three-dimensional space, the feature point position does not change. Feature point positions in a two-dimensional model and a three-dimensional model of the face are invariable in a mapping process.

A mapping of a facial contour curve of the face in the two-dimensional target face image onto the three-dimensional space is related to the three-dimensional posture of the face, and a mapping relationship is:

$$I^c = \mathrm{argmin}_{\{S'\}} \|P_\theta(S') - X^c\|_2 \quad (4);$$

where $X^c$ is the facial contour curve of the face, $I^c$ is an parameterization representation obtained after the facial contour curve $X^c$ of the face is mapped onto the three-dimensional space, S' is the preset initial three-dimensional face shape, and $P_\theta$ is a projection function determined by using the three-dimensional posture θ of the face.

According to this mapping relationship, a target function matching the empirical model of the three-dimensional face shape is constructed by using a criterion of minimizing a reprojection error of the three-dimensional shape:

$$\{\theta^*, b^*\} = \mathrm{argmin}_{\{\theta, b\}} \|(X^c, X^e) - (I^c, I^e)P_\theta(\mu + \Phi b)\|_2 + \lambda \|b/\rho\|_2 \quad (5);$$

where θ is the three-dimensional posture of the face in the target face image, θ* is an optimal value of the three-dimensional posture of the face, b is the deformation coefficient in the empirical model of the three-dimensional face shape, b* is an optimal value of the deformation coefficient that is in the empirical model of the three-dimensional face shape and determined according to the target function, $X^c$ is an parameterization representation of the facial contour curve of the face in the target face image, $X^e$ is an parameterization representation of the feature point position of the face in the target face image, $I^c$ is an parameterization representation obtained after the facial contour curve $X^c$ of the face is mapped onto the three-dimensional space, $I^e$ is an parameterization representation obtained after the feature point position of the face is mapped onto the three-dimensional space, μ is a preset average description of the three-dimensional face shape, Φ is a linear description of face shape deformation, $P_\theta$ is the projection function determined by using the three-dimensional posture θ of the face, and ρ is a preset deformation empirical parameter.

The target function is preset in the system, and in this way, after the facial contour curve, the three-dimensional posture, and the feature point position of the face in the target face image are determined, the optimal value of the deformation coefficient in the empirical model of the three-dimensional face shape is determined according to the mapping the facial contour curve and the feature point position of the face onto the three-dimensional space by using the preset matched target function.

The obtained optimal value of the deformation coefficient is input to the empirical model of the three-dimensional face shape, and the three-dimensional shape S of the face in the target face image can be constructed.

A process of calculating the optimal value of the deformation coefficient by using the target function is an optimization calculation process, and a specific process is the same as an existing calculation manner. For example, an existing Gauss-Newton method may be used for optimization calculation.

For ease of understanding, the calculation process is briefly described in an optimization calculation manner. Because the deformation coefficient in the target function relies on the three-dimensional posture θ, a layered policy may be used, an initial value of the deformation coefficient is set to 0, and optimization calculation is performed on the three-dimensional posture θ until convergence. Then, a deformation coefficient b is recalculated according to a currently-obtained θ and by using the target function, and a three-dimensional posture θ is recalculated according to the obtained b. This process is continuously repeated until both b and θ have converged to obtain the optimal value of the deformation coefficient.

The optimal value of the deformation coefficient is substituted into the empirical model as a value of the deformation coefficient, so as to obtain the three-dimensional face shape.

It may be understood that in any one of the foregoing embodiments, after the three-dimensional face shape is obtained, to reconstruct a three-dimensional face model, texture information of the face needs to be further obtained from the target face image, and the three-dimensional face model is constructed according to the texture information and the three-dimensional shape of the face.

The texture information of the face in the target face image is obtained in an existing texture obtaining manner.

Figure 7A:
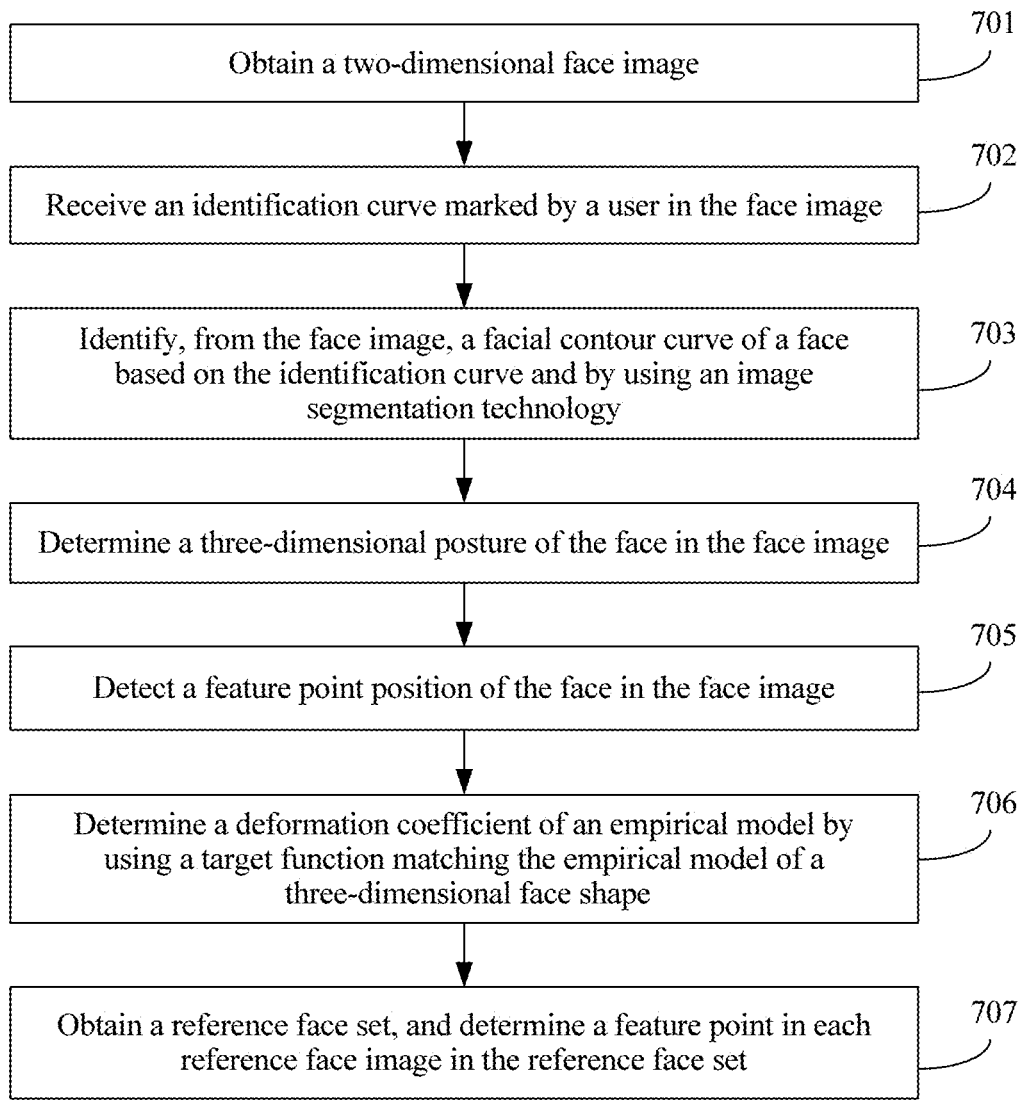
FIG. 7A and FIG. 7B show a schematic flowchart of another embodiment of an image processing method according to this application.
Figure 7B:
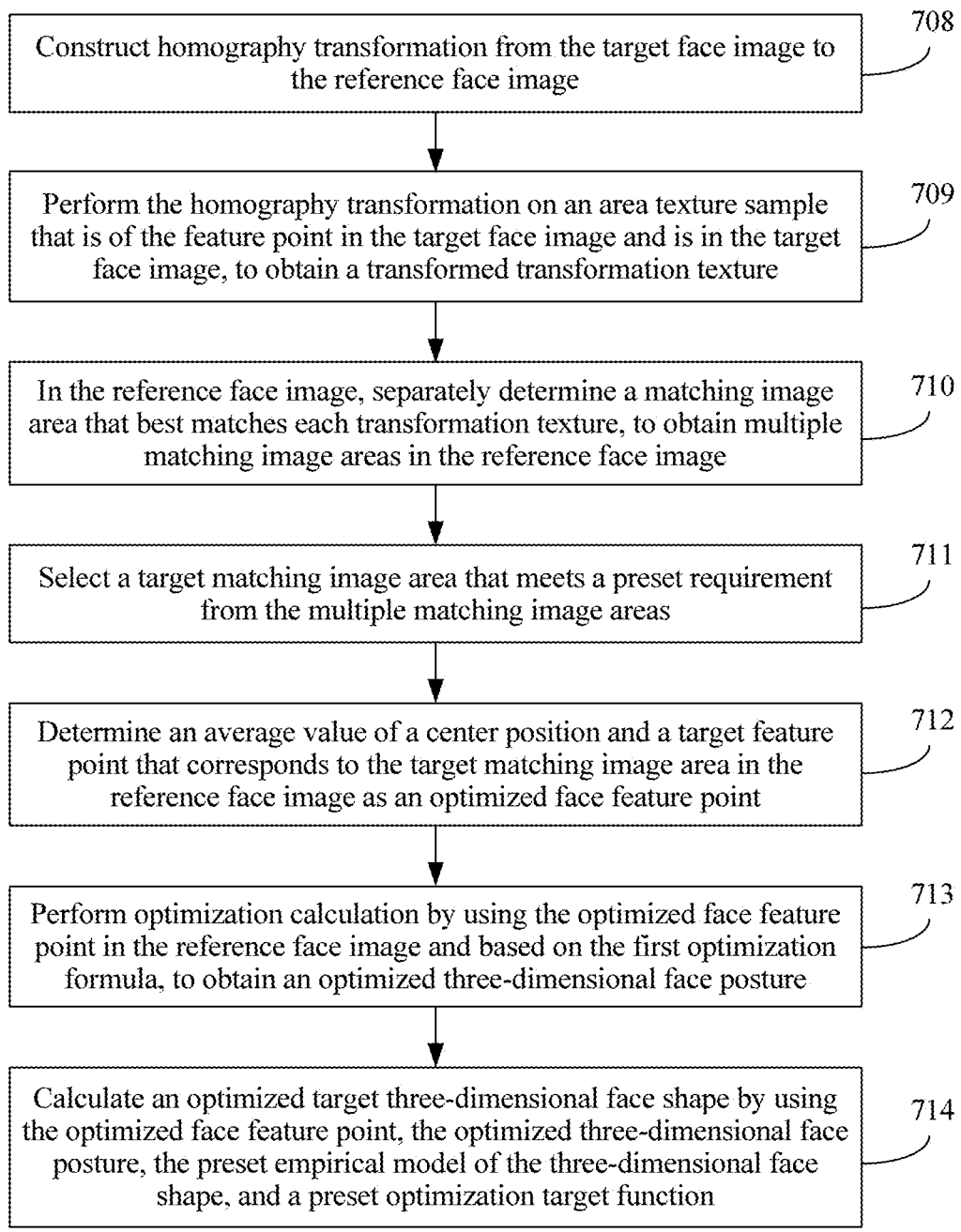

To further improve precision of a constructed three-dimensional face shape, after a three-dimensional shape of a face in a target face image is constructed by using a method in any one of the foregoing embodiments, multiple reference face images may be further used for three-dimensional shape optimization. Referring to FIG. 7A and FIG. 7B, a schematic flowchart of another embodiment of an image processing method according to this application is shown, and the method in this embodiment may include the following.

701. Obtain a two-dimensional target face image.

702. Receive an identification curve marked by a user in the target face image.

The identification curve is used to indicate face contour distribution in the target face image.

703. Identify, from the target face image, a facial contour curve of a face according to the identification curve and by using an image segmentation technology.

704. Determine a three-dimensional posture of the face in the target face image.

705. Detect a feature point position of the face in the target face image.

706. Determine a deformation coefficient of an empirical model by using a target function matching the preset empirical model of a three-dimensional face shape.

The target function is used to determine a deformation coefficient in the empirical model of the three-dimensional face shape according to the three-dimensional posture, the facial contour curve, and the feature point position of the face in the target face image, and mappings of the facial contour curve and the feature point position of the face onto three-dimensional space.

It may be understood that for an implementation process of the foregoing step 701 to step 706, refer to description of a corresponding step in any one of the foregoing embodiments, which is not limited herein.

707. Obtain a reference face set, and determine a feature point in each reference face image in the reference face set.

The reference face set includes multiple reference face images. It may be understood that the multiple reference face images and the target face image belong to a face image of a same person.

The reference face image and the target face image meet a posture complementary principle. For any reference face $I_{re}$ in the reference face set, a three-dimensional posture $\theta_{re}$ of a face in the reference face $I_{re}$ and the three-dimensional posture $\theta$ in the target face image I meet $$\|\theta_{re} - \theta\| > \frac{\pi}{6}.$$

708. Construct homography transformation from the target face image to the reference face image according to the three-dimensional posture of the face in the target face image and a three-dimensional posture of a face in reference face image.

The homography transformation from the target face image to the reference face image actually is homography transformation from the three-dimensional posture $\theta$ in the face image I to the three-dimensional posture $\theta_{re}$ of the face in the reference face image $I_{re}$, that is, the homography transformation $H_{re}$ is $\theta \rightarrow \theta_{re}$.

709. Perform the homography transformation on an area texture sample that is of the feature point in the target face image and is in the target face image to obtain a transformed transformation texture.

For each feature point in the target face image, texture sampling is separately performed around each feature point in the target face image, and according to the homography transformation, homography transformation is performed on a texture obtained by means of sampling, to obtain the transformation texture.

After the homography transformation $H_{re}$ is performed on the area texture sample $T(X^e)$ that is of the feature point $X^e$ in the target face image and is in the target face image, the transformation texture $\overset{u}{T}(X^e)$ is obtained, $$T(X^e) \overset{H_{re}}{\longrightarrow} \overset{\square}{T}(X^e).$$

710. In the reference face image, separately determine a matching image area that best matches each transformation texture $\overset{r}{T}(X^e)$ to obtain multiple matching image areas in the reference face image.

711. Determine, according to a one-to-one correspondence between a matching image area in the reference face image and a feature point in the reference face image, a target feature point that is in the reference face image and corresponds to each matching image area, and select a target matching image area meeting a preset requirement from the multiple matching image areas.

A center position of the matching image area is marked as $\hat{X}_{re}^e$, a target feature point corresponding to the matching image area is marked as $X_{re}^e$, and a center position and a corresponding target feature point in the target matching image area meet the following relationship: $\{\hat{X}_{re}^e, X_{re}^e \| \hat{X}_{re}^e - X_{re}^e | < \varepsilon\}$, where $\varepsilon$ is a preset threshold.

712. Determine an average value of a center position and a target feature point that corresponds to the target matching image area in the reference face image as an optimized face feature point $\hat{X}_{re}$.

The optimized face feature point is $\hat{X}_{re}=(\hat{X}_{re}^e+X_{re}^e)/2$     (6).

713. Perform optimization calculation by using the optimized face feature point $\hat{X}_{re}$ in the reference face image and according to a posture optimization formula, to obtain an optimized three-dimensional face posture $\theta_{re}$.

The posture optimization formula is an optimal value of the optimized three-dimensional face posture:

$$\theta_{re}^* = \mathrm{argmin}_{\{\theta_{re}\}} \|\hat{X}_{re} - I^e P_{\theta_{re}}(\mu + \Phi b^*)\|_2 \quad (7).$$

The optimal value of the optimized three-dimensional face posture is a final to-be-solved specific value of the optimized three-dimensional face posture.

714. Calculate an optimized target three-dimensional face shape by using the optimized face feature point $\hat{X}_{re}$, the optimized three-dimensional face posture $\theta_{re}$, the preset empirical model of the three-dimensional face shape, and a preset optimization target function.

The optimization target function is:

$$\Delta b^* = \mathrm{argmin}_{\{\Delta b\}} \|P_{\theta_{re}}^{-1} \hat{X}_{re} - I^e(\mu + \Phi(b^* + \Delta b))\|_1. \quad (8);$$

where $I^e$ is an parameterization representation obtained after the feature point position of the face is mapped onto the three-dimensional space, $\theta_{re}$ is a to-be-solved optimized three-dimensional posture in the posture optimization formula, $\theta_{re}^*$ is an optimal value of the optimized three-dimensional posture, $P_{\theta_{re}}$ is a projection function determined according to the optimized three-dimensional posture $\theta_{re}$ of the face, $\Delta b$ is an optimized deformation coefficient, $\Delta b^*$ is an optimal value that is of the optimized target deformation coefficient and obtained according to the optimization target function, and $b^*$ is the deformation coefficient that is of the empirical model of the face shape and is solved according to step 706.

The optimal value $\Delta b^*$ of the optimized deformation coefficient may be obtained by using the above optimization target function in the formula 8, $\Delta b^*$ is a final value of the optimized deformation coefficient $\Delta b$, $\Delta b^*$ is substituted into the empirical model of the three-dimensional face shape, and the optimized target three-dimensional face shape may be obtained.

In this embodiment, an optimized three-dimensional face shape is redetermined by using a reference face image that includes a same face in the target face image so that precision of a constructed three-dimensional face shape is higher.

Considering reasons such as self-occlusion of a face and image sampling, face texture detail missing in a partial area may be caused, and an obvious blurring phenomenon may occur. Optionally, to improve a sense of reality of a constructed face texture, after an optimized three-dimensional face shape is obtained in a manner shown in the embodiment in FIG. 7A and FIG. 7B, the method may further include reprojecting each reference face image onto the three-dimensional space according to the optimized target three-dimensional face shape and a three-dimensional posture of the reference face image in the reference face image set to obtain a face texture set including multiple face textures corresponding to the multiple reference face images, and performing face texture reconstruction according to the multiple face textures in the face texture set to obtain an optimized target face texture.

When face texture reconstruction is performed by using the multiple face textures, normalization is separately performed on each point in a face texture, and the multiple face texture are integrated into one face texture.

A manner of constructing a face texture according to face textures of the multiple reference images may reduce face texture detail missing in a partial area, thereby improving a sense of reality of the constructed face texture.

Optionally, a three-dimensional face model may be constructed by using a target three-dimensional face shape and a target face texture determined in the foregoing manner so as to further improve precision of a constructed three-dimensional face.

According to the foregoing descriptions of the method embodiments, a person skilled in the art may clearly understand that this application may be implemented by software in addition to a necessary universal hardware platform or by hardware only. In most circumstances, the former is a preferred implementation manner.

Corresponding to the method in the embodiments of this application, this application further provides an image processing apparatus.

Figure 8:
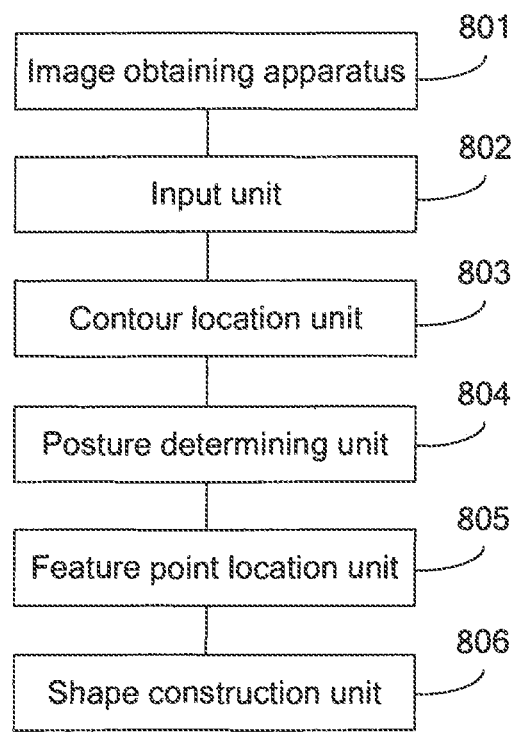
FIG. 8 shows a schematic structural diagram of an embodiment of an image processing apparatus according to this application.

Referring to FIG. 8, a schematic structural diagram of an embodiment of an image processing apparatus according to this application is shown. The apparatus in this embodiment may include an image obtaining apparatus 801 configured to obtain a two-dimensional target face image, an input unit 802 configured to receive an identification curve marked by a user in the target face image, where the identification curve is used to indicate face contour distribution in the target face image, a contour location unit 803 configured to locate a facial contour curve of a face from the target face image according to the identification curve and by using an image segmentation technology, a posture determining unit 804 configured to determine a three-dimensional posture of the face in the target face image, a feature point location unit 805 configured to detect a feature point position of the face in the target face image, and a shape construction unit 806 configured to construct a three-dimensional shape of the face in the target face image according to the facial contour curve, the three-dimensional posture, and the feature point position of the face in the target face image by using a preset empirical model of a three-dimensional face shape and a target function matching the empirical model of the three-dimensional face shape, where the target function is used to determine a deformation coefficient of the empirical model according to the three-dimensional posture, the facial contour curve, and the feature point position of the face in the target face image, and mappings of the facial contour curve and the feature point position of the face onto three-dimensional space.

Optionally, according to a possible situation of the entered identification curve, the input unit may include a first input subunit configured to receive an initial facial contour curve that is of the face and marked by the user in the target face image, and correspondingly, the contour location unit includes an extraction subunit configured to extract a sub-image area including the initial facial contour curve from the target face image, an area segmentation subunit configured to partition the sub-image area by using an image over-segmentation technology to obtain at least two segmentation areas, a boundary extraction subunit configured to extract boundaries of the at least two segmentation areas, and a first contour location subunit configured to match, by using a curve matching algorithm from the boundaries of the at least two segmentation areas, a boundary curve closest to the initial facial contour curve, and determine the matched boundary curve as the facial contour curve of the face in the target face image.

Optionally, according to another possible case of the entered identification curve, the input unit may include a second input subunit configured to receive a first identification curve and a second identification curve that are entered by the user into the target face image, where the first identification curve is used to identify a foreground area that is in the target face image and that includes the face, and the second identification curve is used to identify a background area that is in the target face image and that does not include the face, and correspondingly, the contour location unit includes a foreground segmentation subunit configured to partition the foreground area and the background area of the target face image by using the image segmentation technology with reference to the first identification curve and the second identification curve, and a second contour location subunit configured to perform contour line extraction on the target face image according to the foreground area and the background area of the target face image to extract the facial contour curve of the face in the target face image.

Optionally, according to a manner of determining the three-dimensional posture by the posture determining unit, the posture determining unit may include a face detection unit configured to detect a face area in the target face image, a first feature extraction unit configured to perform binarization feature extraction in the face area, and a posture prediction unit configured to perform regression prediction according to an extracted binarization feature and by using a preset posture regression prediction function to obtain the three-dimensional posture of the face in the target face image.

Optionally, according to a manner of determining the feature point by the feature point location unit, the feature point location unit may include a face area determining unit configured to determine a face area in the target face image, a second feature extraction unit configured to perform, according to a preset face initial feature point position, binarization feature extraction in a specified range of the initial feature point position in the face area, and a feature point prediction unit configured to perform regression prediction according to an extracted binarization feature by using a preset feature point regression prediction function to obtain the feature point position of the face in the target face image.

Optionally, in any one of the foregoing implementation manners, the shape construction unit may include a deformation coefficient determining unit configured to determine an optimal value of the deformation coefficient in the empirical model of the three-dimensional face shape according to the mappings of the face facial contour curve and the face feature point position onto the three-dimensional space by using the target function matching the preset empirical model of the three-dimensional face shape, where the target function is:

$$\{\theta^*, b^*\} = \mathrm{argmin}_{\{\theta, b\}} \|(X^c, X^e) - (I^c, I^e) P_\theta (\mu + \Phi b)\|_2 + \lambda \|b/\rho_2,$$

where $\theta$ is the three-dimensional posture of the face in the target face image, $\theta^*$ is an optimal value of the three-dimensional posture of the face, b is the deformation coefficient in the empirical model of the three-dimensional face shape, b* is an optimal value of the deformation coefficient b that is in the empirical model of the three-dimensional face shape and determined according to the target function, $X^c$ is an parameterization representation of the facial contour curve of the face in the target face image, $X^e$ is an parameterization representation of the feature point position of the face in the target face image, $I^c$ is an parameterization representation obtained after the facial contour curve $X^c$ is mapped onto the three-dimensional space, $I^e$ is an parameterization representation obtained after the feature point position of the face is mapped onto the three-dimensional space, $\mu$ is a preset average description of the three-dimensional face shape, $\Phi$ is a linear description of face shape deformation, $P_\theta$ is a projection function determined by using the three-dimensional posture $\theta$ of the face, and $\rho$ is a preset deformation empirical parameter; where $$I^c = \mathrm{argmin}_{\{S'\}} \|P_\theta(S') - X^c\|_2; \text{ and}$$

S' is a preset initial three-dimensional face shape; and
a shape construction subunit, configured to input the optimal value of the deformation coefficient to the empirical model of the three-dimensional face shape, to construct the three-dimensional shape of the face in the target face image, where the empirical model of the three-dimensional face shape is:

$$S = \mu + \Phi b;$$

where S is a parameterization representation of the three-dimensional face shape.

Further, on a basis of any one of the foregoing embodiments, the apparatus may further include a reference obtaining unit configured to obtain a reference face set, and separately locate a feature point in each reference face image of the reference face set, where the reference face image and the target face image meet a posture complementary principle; a homography transformation unit configured to construct homography transformation from the target face image to the reference face image according to the three-dimensional posture of the face in the target face image and a three-dimensional posture of a face in reference face image, a texture transformation unit configured to perform the homography transformation on area texture sample that is of each feature point in the target face image and is in the target face image, to obtain multiple transformed transformation texture, a texture matching unit configured to, in the reference face image, separately determine a matching image area that best matches each of the transformation textures to obtain multiple matching image areas in the reference face image, a target area matching unit configured to determine, according to a one-to-one correspondence between a matching image area in the reference face image and a feature point in the reference face image, a target feature point that is in the reference face image and corresponds to each matching image area, and determine a target matching image area meeting a preset requirement in the multiple matching image areas, where a center position $\hat{X}_{re}^e$ of the target matching image area and a target feature point $X_{re}^e$ corresponding to the target matching image area meet $\{\hat{X}_{re}^e, X_{re}^e \| \hat{X}_{re}^e - X_{re}^e \| < \varepsilon\}$, where $\varepsilon$ is a preset threshold, a feature point optimization unit configured to determine an average value of the center position $\hat{X}_{re}^e$ and the target feature point $X_{re}^e$ corresponding to the target matching image area as an optimized face feature point $\hat{X}_{re}$, a posture optimization unit configured to perform optimization calculation by using the optimized face feature point $\hat{X}_{re}$ and according to a posture optimization formula to obtain an optimized three-dimensional face posture $\theta_{re}$, where the posture optimization formula is $\theta_{re}^* = \mathrm{argmin}_{\{\theta_{re}\}} \|\hat{X}_{re} - I^e P_{\theta_{re}}(\mu + \Phi b^*)\|_2$, and a shape optimization unit configured to calculate an optimized target three-dimensional face shape by using the optimized face feature point $\hat{X}_{re}$, the optimized three-dimensional face posture $\theta_{re}$, the preset empirical model of the three-dimensional face shape, and a preset optimization target function, where the optimization target function is:

$$\Delta b^* = \mathrm{argmin}_{\{\Delta b\}} \|P_{\theta_{re}}^{-1} \hat{X}_{re} - S^e(\mu + \Phi(b^* + \Delta b))\|_1;$$

where in the foregoing formula, $I^e$ is an parameterization representation obtained after the face feature point position of the face determined by the feature point position unit is mapped onto the three-dimensional space, $\theta_{re}$ is a to-be-solved optimized three-dimensional posture in the posture optimization formula, $\theta_{re}^*$ is an optimal value of the optimized three-dimensional posture, $P_{\theta_{re}}$ is a projection function determined by using the optimized three-dimensional posture $\theta_{re}$ of the face, $\Delta b$ is an optimized deformation coefficient, $\Delta b^*$ is a target deformation coefficient optimal value obtained according to the optimization target function, and b* is the deformation coefficient that is of the face shape empirical model and is resolved according to the target function.

Figure 9:
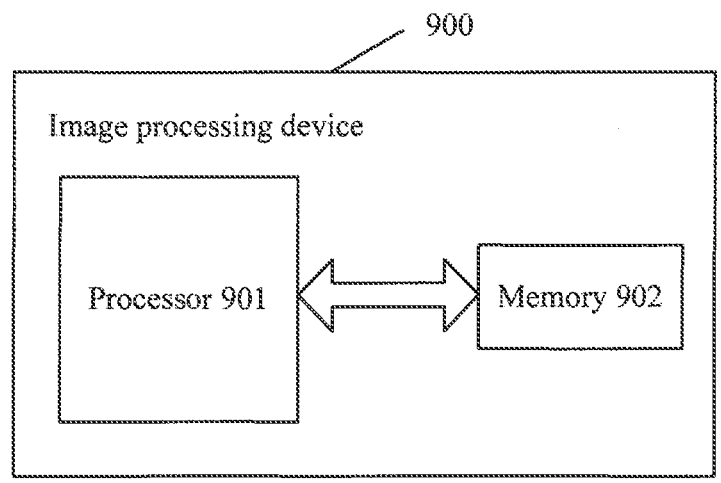
FIG. 9 shows a schematic structural diagram of an embodiment of a computing node according to this application.

In another aspect, this application further provides an image processing device. Referring to FIG. 9, a schematic structural diagram of an embodiment of an image processing device according to this application is shown, and the image processing device 900 in this embodiment includes at least a processor 901 and a memory 902.

The processor 901 is configured to obtain a two-dimensional target face image, receive an identification curve marked by a user in the target face image, where the identification curve is used to indicate face contour distribution in the target face image, locate a facial contour curve of a face from the target face image according to the identification curve and by using an image segmentation technology, determine a three-dimensional posture of the face in the target face image, detect a feature point position of the face in the target face image, and construct a three-dimensional shape of the face in the target face image according to the facial contour curve, the three-dimensional posture, and the feature point position of the face in the target face image by using a preset empirical model of a three-dimensional face shape and a target function matching the empirical model of the three-dimensional face shape, where the target function is used to determine a deformation coefficient of the empirical model according to the three-dimensional posture, the facial contour curve, and the feature point position of the face in the target face image, and mappings of the facial contour curve and the feature point position of the face onto three-dimensional space.

The memory 902 is configured to store the obtained two-dimensional target face image and a program run by the processor.

The processor may be a central processing unit (CPU) or an application-specific integrated circuit Application Specific Integrated Circuit (ASIC), or is configured as one or more integrated circuits that implement the embodiment of the present invention. The memory may include a high-speed Random Access Memory (RAM) memory, and may further include a non-volatile memory.

Optionally, the image processing device may further include a communications interface and a communications bus (not shown in the figure).

An apparatus embodiment basically corresponds to a method embodiment, and therefore for related parts, reference may be made to partial descriptions in the method embodiment. The described system embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present invention without creative efforts.

In the several embodiments provided in this application, it should be understood that the disclosed system and method may be implemented in other manners without exceeding the spirit and the scope of this application. The current embodiment is merely an exemplary example instead of limitation, and the given specific content should not limit a purpose of this application. For example, the unit or sub-unit division is merely logical function division and may be other division in actual implementation. For example, a plurality of units or sub-units may be combined. In addition, a plurality of units or components may be combined or may be integrated into another system, or some features may be ignored or not performed.

In addition, without exceeding the scope of this application, the foregoing method and apparatus and schematic diagrams of different embodiments may be combined or integrated with another system, module, technology, or method.

The foregoing descriptions are merely specific implementation manners of this application. It should be noted that a person of ordinary skill in the art may make several improvements or polishing without departing from the principle of this application and the improvements or polishing shall fall within the protection scope of this application.

What is claimed is:

1. A computer-implemented image processing method, comprising:
   obtaining a two-dimensional target face image;
   receiving an identification curve marked by a user in the target face image, wherein the identification curve is used to indicate face contour distribution in the target face image;
   locating a facial contour curve of a face from the target face image according to the identification curve and by using an image segmentation technology;
   determining a three-dimensional posture of the face in the target face image;
   detecting a feature point position of the face in the target face image;
   determining mappings of the facial contour curve and the feature point position of the face onto three-dimensional space;
   determining, using a target function matching an empirical model of a three-dimensional face shape, a deformation coefficient of the empirical model according to the three-dimensional posture, the facial contour curve, the feature point position of the face in the target face image, and the mappings; and
   constructing a three-dimensional shape of the face in the target face image according to the facial contour curve, the three-dimensional posture, and the feature point position of the face in the target face image using the empirical model and the deformation coefficient.

2. The method according to claim 1, wherein receiving the identification curve marked by a user in the target face image comprises receiving an initial facial contour curve that is of the face and marked by the user in the target face image, and wherein locating the facial contour curve of the face from the target face image according to the identification curve and using the image segmentation technology comprises:
   extracting a sub-image area comprising the initial facial contour curve from the target face image;
   partitioning the sub-image area by using an image over-segmentation technology, to obtain at least two segmentation areas;
   extracting boundaries of the at least two segmentation areas; and
   matching, by using a curve matching algorithm from the boundaries of the at least two segmentation areas, a boundary curve closest to the initial facial contour curve, and determining the matched boundary curve as the facial contour curve of the face in the target face image.

3. The method according to claim 1, wherein receiving the identification curve marked by the user in the target face image comprises receiving a first identification curve and a second identification curve that are entered by the user into the target face image, wherein the first identification curve is used to identify a foreground area that is in the target face image and that comprises the face, wherein the second identification curve is used to identify a background area that is in the target face image and that does not comprise the face, and wherein locating the facial contour curve according to the identification curve and by using the image segmentation technology comprises:
   partitioning the foreground area and the background area of the target face image using the image segmentation technology with reference to the first identification curve and the second identification curve; and
   performing contour line extraction on the target face image according to the foreground area and the background area of the target face image to extract the facial contour curve of the face in the target face image.

4. The method according to claim 1, wherein determining the three-dimensional posture of the face in the target face image comprises:
   detecting a face area in the target face image;
   performing binarization feature extraction in the face area; and
   performing regression prediction according to an extracted binarization feature and using a preset posture regression prediction function to obtain the three-dimensional posture of the face in the target face image.

5. The method according to claim 1, wherein detecting the feature point position of the face in the target face image comprises:
   determining a face area in the target face image;
   performing, according to a preset face initial feature point position, binarization feature extraction in a specified range of the preset face initial feature point position in the face area; and
   performing regression prediction according to an extracted binarization feature using a preset feature point regression prediction function to obtain the feature point position of the face in the target face image.

6. The method according to claim 1, wherein the target function is:

$$\{\theta^*, b^*\} = \operatorname{argmin}_{\{\theta, b\}} \|(X^c, X^e) - (I^c, I^e) P_\theta (\mu + \Phi b)\|_2 + \lambda \|b/\rho\|_2,$$

wherein θ is the three-dimensional posture of the face in the target face image, wherein θ* is an optimal value of the three-dimensional posture of the face, wherein h is the deformation coefficient in the empirical model of the three-dimensional face shape, wherein b* is an optimal value of the deformation coefficient b that is in the empirical model of the three-dimensional face shape and determined according to the target function, wherein $X^c$ is a parameterization representation of the facial contour curve of the face in the target face image, wherein $X^c$ is a parameterization representation of the feature point position of the face in the target face image, wherein $I^c$ is a parameterization representation obtained after the facial contour curve $X^c$ is mapped onto the three-dimensional space, wherein $I^e$ is a parameterization representation obtained after the feature point position of the face is mapped onto the three-dimensional space, wherein μ is a preset average description of the three-dimensional face shape, wherein Φ is a linear description of face shape deformation, wherein $P_θ$ is a projection function determined by using the three-dimensional posture θ of the face, wherein ρ is a preset deformation empirical parameter, wherein $I^c = \mathrm{argmin}_{\{S'\}} \|P_θ(S') - X^c\|_2$, and wherein S' is a preset initial three-dimensional face shape, and wherein the method further comprises inputting the optimal value of the deformation coefficient to the empirical model of the three-dimensional face shape to construct the three-dimensional shape of the face in the target face image, wherein the empirical model of the three-dimensional face shape is:

$$S = \mu + \Phi b, \text{ and}$$

wherein S is a parameterization representation of the three-dimensional face shape.

7. The method according to claim 1, wherein after constructing the three-dimensional shape of the face in the target face image, the method further comprises:

obtaining a reference face set;

separately locating a feature point in each reference face image of the reference face set, wherein the reference face image and the target face image meet a posture complementary principle;

constructing homography transformation from the target face image to the reference face image according to the three-dimensional posture of the face in the target face image and a three-dimensional posture of a face in the reference face image;

performing the homography transformation on an area texture sample that is of each feature point in the target face image and is in the target face image to obtain multiple transformed transformation textures;

separately determining a matching image area in the reference face image that best matches each of the transformation textures to obtain multiple matching image areas in the reference face image;

determining, according to a one-to-one correspondence between a matching image area in the reference face image and a feature point in the reference face image, a target feature point that is in the reference face image and corresponds to each matching image area;

determining a target matching image area meeting a preset requirement in the multiple matching image areas, wherein a center position $\hat{X}_{re}^e$ of the target matching image area and a target feature point $X_{re}^e$ corresponding to the target matching image area meet $\{\hat{X}_{re}^e, X_{re}^e | \|\hat{X}_{re}^e - X_{re}^e\| < \varepsilon\}$, wherein ε is a preset threshold;

determining an average value of the center position $\hat{X}_{re}^e$ and the target feature point $X_{re}^e$ corresponding to the target matching image area as an optimized face feature point $\hat{X}_{re}$;

performing optimization calculation using the optimized face feature point $\hat{X}_{re}$ and according to a posture optimization formula to obtain an optimized three-dimensional face posture $θ_{re}$, wherein the posture optimization formula is $θ_{re}^* = \mathrm{argmin}_{\{θ_{re}\}} \|\hat{X}_{re} - I^e P_{θ_{re}}(\mu + \Phi b^*)\|_2$; and calculating an optimized target three-dimensional face shape using the optimized face feature point $\hat{X}_{re}$, the optimized three-dimensional face posture $θ_{re}$, the preset empirical model of the three-dimensional face shape, and a preset optimization target function, wherein the optimization target function is:

$$\Delta b^* = \mathrm{argmin}_{\{\Delta b\}} \|P_{θ_{re}}^{-1} \hat{X}_{re} - I^e(\mu + \Phi(b^* + \Delta b))\|_1,$$

wherein $I^e$ is a parameterization representation obtained after the feature point position of the face is mapped onto the three-dimensional space, wherein $θ_{re}$ is a to-be-solved optimized three-dimensional posture in the posture optimization formula, wherein $θ_{re}^*$ is an optimal value of the optimized three-dimensional posture, wherein $P_{θ_{re}}$ is a projection function determined using the optimized three-dimensional posture $θ_{re}$ of the face, wherein b* is the deformation coefficient determined according to the target function, wherein Δb is an optimized target deformation coefficient in the three-dimensional face shape of the empirical model, and wherein Δb* is an optimal value of the optimized target deformation coefficient determined according to the optimization target function.

8. An image processing apparatus, comprising:

a processor; and a non-transitory computer-readable storage medium coupled to the processor and storing programming instructions for execution by the processor, wherein the programming instructions instruct the processor to:

obtain a two-dimensional target face image;

receive an identification curve marked by a user in the target face image, wherein the identification curve is used to indicate face contour distribution in the target face image;

locate a facial contour curve of a face from the target face image according to the identification curve and using an image segmentation technology;

determine a three-dimensional posture of the face in the target face image;

detect a feature point position of the face in the target face image;

determine mappings of the facial contour curve and the feature point position of the face onto three-dimensional space;

determine, using a target function matching an empirical model of a three-dimensional face shape, a deformation coefficient of the empirical model according to the three-dimensional posture, the facial contour curve, the feature point position of the face in the target face image, and the mappings; and construct a three-dimensional shape of the face in the target face image according to the facial contour curve, the three-dimensional posture, and the feature point position of the face in the target face image using the empirical model and the deformation coefficient.

9. The apparatus according to claim 8, wherein the programming instructions instruct the processor to:
receive an initial facial contour curve that is of the face and marked by the user in the target face image;
extract a sub-image area comprising the initial facial contour curve from the target face image;
partition the sub-image area using an image over-segmentation technology, to obtain at least two segmentation areas;
extract boundaries of the at least two segmentation areas;
match, using a curve matching algorithm from the boundaries of the at least two segmentation areas, a boundary curve closest to the initial facial contour curve; and
determine the matched boundary curve as the facial contour curve of the face in the target face image.

10. The apparatus according to claim 8, wherein the programming instructions instruct the processor to:
receive a first identification curve and a second identification curve that are entered by the user into the target face image, wherein the first identification curve is used to identify a foreground area that is in the target face image and that comprises the face, and wherein the second identification curve is used to identify a background area that is in the target face image and that does not comprise the face;
partition the foreground area and the background area of the target face image using the image segmentation technology with reference to the first identification curve and the second identification curve; and
perform contour line extraction on the target face image according to the foreground area and the background area of the target face image to extract the facial contour curve of the face in the target face image.

11. The apparatus according to claim 8, wherein the programming instructions instruct the processor to:
detect a face area in the target face image;
perform binarization feature extraction in the face area; and
perform regression prediction according to an extracted binarization feature and using a preset posture regression prediction function to obtain the three-dimensional posture of the face in the target face image.

12. The apparatus according to claim 8, wherein the programming instructions instruct the processor to:
determine a face area in the target face image;
perform, according to a preset face initial feature point position, binarization feature extraction in a specified range of the preset face initial feature point position in the face area; and
perform regression prediction according to an extracted binarization feature using a preset feature point regression prediction function to obtain the feature point position of the face in the target face image.

13. The apparatus according to claim 8, wherein the target function is:

$$\{\theta^*, b^*\} = \mathrm{argmin}_{\{\theta,b\}} \|(X^c, X^e) - (I^c, I^e) P_\theta(\mu + \Phi b)\|_2 + \lambda \|b/\rho\|_2,$$

wherein θ is the three-dimensional posture of the face in the target face image, wherein θ* is an optimal value of the three-dimensional posture of the face, wherein b is the deformation coefficient in the empirical model of the three-dimensional face shape, wherein b* is an optimal value of the deformation coefficient b that is in the empirical model of the three-dimensional face shape and determined according to the target function, wherein $X^c$ is a parameterization representation of the facial contour curve of the face in the target face image, wherein $X^e$ is a parameterization representation of the feature point position of the face in the target face image, wherein $I^c$ is a parameterization representation obtained after the facial contour curve $X^c$ is mapped onto the three-dimensional space, wherein $I^e$ is a parameterization representation obtained after the feature point position of the face is mapped onto the three-dimensional space, wherein μ is a preset average description of the three-dimensional face shape, wherein Φ is a linear description of face shape deformation, wherein $P_\theta$ is a projection function determined by using the three-dimensional posture θ of the face, wherein ρ is a preset deformation empirical parameter, wherein $I^c = \mathrm{argmin}_{\{S'\}} \|P_\theta(S') - X^c\|_2$, wherein S' is a preset initial three-dimensional face shape, and
wherein the programming instructions instruct the processor to input the optimal value of the deformation coefficient to the empirical model of the three-dimensional face shape to construct the three-dimensional shape of the face in the target face image, wherein the empirical model of the three-dimensional face shape is:

$$S = \mu + \Phi b, \text{ and}$$

wherein S is a parameterization representation of the three-dimensional face shape.

14. The apparatus according to claim 8, wherein the programming instructions further instruct the processor to;
obtain a reference face set;
separately locate a feature point in each reference face image of the reference face set, wherein the reference face image and the target face image meet a posture complementary principle;
construct homography transformation from the target face image to the reference face image according to the three-dimensional posture of the face in the target face image and a three-dimensional posture of a face in the reference face image;
perform the homography transformation on an area texture sample that is of each feature point in the target face image and is in the target face image to obtain multiple transformed transformation texture;
separately determine a matching image area in the reference face image that best matches each of the transformation textures to obtain multiple matching image areas in the reference face image;
determine, according to a one-to-one correspondence between a matching image area in the reference face image and a feature point in the reference face image, a target feature point that is in the reference face image and that corresponds to each matching image area;
determine a target matching image area meeting a preset requirement in the multiple matching image areas, wherein a center position $\hat{X}_{re}^e$ of the target matching image area and a target feature point $X_{re}^e$ corresponding to the target matching image area meet $\{\hat{X}_{re}^e, X_{re}^e | |\hat{X}_{re}^e - X_{re}^e| < \varepsilon\}$, wherein ε is a preset threshold;
determine an average value of the center position $\hat{X}_{re}^e$ and the target feature point $X_{re}^e$ corresponding to the target matching image area as an optimized face feature point $\hat{X}_{re}$;
perform optimization calculation using the optimized face feature point a $\hat{X}_{re}$ and according to a posture optimization formula to obtain an optimized three-dimensional face posture $\theta_{re}$, wherein the posture optimization formula is $\theta_{re}^* = \mathrm{argmin}_{\{\theta_{re}\}} \|\hat{X}_{re} - I^e P_{\theta_{re}}(\mu + \Phi b^*)\|_2$; and
calculate an optimized target three-dimensional face shape using the optimized face feature point $\hat{X}_{re}$, the optimized three-dimensional face posture $\theta_{re}$, the preset empirical model of the three-dimensional face shape, and a preset optimization target function;

wherein the optimization target function is:

$$\Delta b' \text{argmin}_{\{\Delta b\}} \|P_{\theta_{re}}^{-1}\hat{X}_{re} - I^e(\mu + \Phi(b^* + \Delta b))\|_1;$$

wherein $I^e$ is a parameterization representation obtained after the feature point position of the face determined by the feature point location unit is mapped onto the three-dimensional space, wherein $\theta_{re}$ is a to-be-solved optimized three-dimensional posture in the posture optimization formula, wherein $\theta_{re}^*$ is an optimal value of the optimized three-dimensional posture, wherein $P_{\theta_{re}}$ is a projection function determined by using the optimized three-dimensional posture $\theta_{re}$ of the face, wherein b* is the deformation coefficient determined according to the target function, wherein Δb is an optimized target deformation coefficient in the three-dimensional face shape of the empirical model, and wherein Δb* is an optimal value of the optimized target deformation coefficient determined according to the optimization target function.

15. A computer-implemented image processing method, comprising:

obtaining a two-dimensional target face image;

receiving an identification curve marked by a user in the target face image, wherein the identification curve is used to indicate face contour distribution in the target face image;

locating a facial contour curve of a face from the target face image according to the identification curve and by using an image segmentation technology;

determining a three-dimensional posture of the face in the target face image;

detecting a feature point position of the face in the target face image;

deter lining a projection function using the three-dimensional posture of the face;

determining mappings of the facial contour curve and the feature point position of the face onto three-dimensional space, wherein a mapping of the facial contour curve onto the three-dimensional space is determined using the projection function;

determining, using a target function matching an empirical model of a three-dimensional face shape, a deformation coefficient of the empirical model according to the three-dimensional posture, the facial contour curve, the feature point position of the face in the target face image, and the mappings; and constructing a three-dimensional shape of the face in the target face image according to the facial contour curve, the three-dimensional posture, and the feature point position of the face in the target face image using the empirical model and the deformation coefficient.

16. The method according to claim 15, wherein receiving the identification curve marked by the user in the target face image comprises receiving an initial facial contour curve that is of the face and marked by the user in the target tee image, and wherein locating the facial contour curve of the face from the target face image according to the identification curve and using the image segmentation technology comprises:

extracting a sub-image area comprising the initial facial contour curve from the target face image;

partitioning the sub-image area by using an image over-segmentation technology, to obtain at least two segmentation areas;

extracting boundaries of the at least two segmentation areas; and matching, by using a curve matching algorithm from the boundaries of the at least two segmentation areas, a boundary curve closest to the initial facial contour curve, and determining the matched boundary curve as the facial contour curve of the face in the target face image.

17. The method according to claim 15, wherein receiving the identification curve marked by a user in the target face image comprises receiving a first identification curve and a second identification curve that are entered by the user into the target face image, wherein the first identification curve is used to identify a foreground area that is in the target face image and that comprises the face, wherein the second identification curve is used to identify a background area that is in the target face image and that does not comprise the face, and wherein locating the facial contour curve of the face from the target face image according to the identification curve and using the image segmentation technology comprises:

partitioning the foreground area and the background area of the target face image by using the image segmentation technology with reference to the first identification curve and the second identification curve; and performing contour line extraction on the target face image according to the foreground area and the background area of the target face image, to extract the facial contour curve of the face in the target face image.

18. The method according to claim 15, wherein determining the three-dimensional posture of the face in the target face image comprises:

detecting a face area in the target face image;

performing binarization feature extraction in the face area; and performing regression prediction according to an extracted binarization feature and using a preset posture regression prediction function to obtain the three-dimensional posture of the face in the target face image.

19. The method according to claim 15, wherein detecting the feature point position of the face in the target face image comprises:

determining a face area in the target face image;

performing, according to a preset face initial feature point position, binarization feature extraction in a specified range of the preset face initial feature point position in the face area; and performing regression prediction according to an extracted binarization feature using a preset feature point regression prediction function to obtain the feature point position of the face in the target face image.

20. The method according to claim 15, wherein the target function is:

$$\{\theta^*, b^*\} = \text{argmin}_{\{\theta, b\}} \|(X^c, X^e) - (I^c, I^e)P_\theta(\mu + \Phi b)\|_2 + \lambda\|b/\rho\|_2,$$

wherein θ is the three-dimensional posture of the face in the target face image, wherein θ* is an optimal value of the three-dimensional posture of the face, wherein h is the deformation coefficient in the empirical model of the three-dimensional face shape, wherein b* is an optimal value of the deformation coefficient b that is in the empirical model of the three-dimensional face shape and determined according to the target function, wherein $X^c$ is a parameterization representation of the facial contour curve of the face in the target face image, wherein $X_e$ is a parameterization representation of the feature point position of the face in the target face image, wherein $I^c$ is a parameterization representation obtained after the facial contour curve $X^c$ is mapped onto the three-dimensional space, wherein $I^e$ is a parameterization representation obtained after the feature point position of the face is mapped onto the three-dimensional space, wherein $\mu$ is a preset average description of the three-dimensional face shape, wherein $\Phi$ is a linear description of face shape deformation, wherein $P_\theta$ is the projection function, and wherein $\beta$ is a preset deformation empirical parameter.

* * * * *

UNITED STATES PATENT AND TRADEMARK OFFICE
CERTIFICATE OF CORRECTION

PATENT NO. : 10,043,308 B2
APPLICATION NO. : 15/296138
DATED : August 7, 2018
INVENTOR(S) : Wei Zhang, Chunjing Xu and Jianzhuang Liu It is certified that error appears in the above-identified patent and that said Letters Patent is hereby corrected as shown below:

On the Title Page

Item (30): "201410204145" should read "201410204145.3"

In the Claims

Column 25, Line 3 Claim 6: "h" should read "b"

Column 28, Line 62 Claim 14: "feature point a" should read "feature point"

Column 29, Line 6 Claim 14: In the formula, insert -- = -- before "*argmin*"

Column 29, Line 38 Claim 15: "deter lining" should read "determining"

Column 29, Line 38 Claim 15: "tee" should read "face"

Column 30, Line 59 Claim 20: "h" should read "b"

Column 30, Line 67 Claim 20: "$X_e$" should read "$X^e$"

Column 31, Line 11 Claim 20: "β" should read "$\rho$"

Signed and Sealed this
Eighteenth Day of September, 2018

Andrei Iancu
*Director of the United States Patent and Trademark Office*